United States Patent
Xu et al.

(10) Patent No.: US 11,188,970 B1
(45) Date of Patent: Nov. 30, 2021

(54) FOOD DELIVERY OPTIMIZATION

(71) Applicant: DoorDash, Inc., San Francisco, CA (US)

(72) Inventors: Wensi Xu, San Francisco, CA (US); Michael Kane, Oakland, CA (US); Alexei Savtchenko, San Francisco, CA (US); Christopher Hollindale, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 150 days.

(21) Appl. No.: 16/130,761

(22) Filed: Sep. 13, 2018

(51) Int. Cl.
*G06Q 30/06* (2012.01)
*G06Q 50/12* (2012.01)
*G06Q 10/08* (2012.01)

(52) U.S. Cl.
CPC ....... *G06Q 30/0635* (2013.01); *G06Q 10/087* (2013.01); *G06Q 30/0641* (2013.01); *G06Q 50/12* (2013.01)

(58) Field of Classification Search
CPC ............. G06Q 30/0635; G06Q 10/087; G06Q 30/0641; G06Q 50/12
USPC ..................................................... 705/26.81
See application file for complete search history.

(56) References Cited

U.S. PATENT DOCUMENTS

| | | | |
|---|---|---|---|
| 6,026,375 A | 2/2000 | Hall et al. | |
| 6,324,476 B1 | 11/2001 | Trovato | |
| 9,269,103 B1 | 2/2016 | Kumar et al. | |
| 9,639,908 B1 | 5/2017 | Reiss et al. | |
| 9,679,489 B2 | 6/2017 | Lambert et al. | |
| 9,754,331 B1 | 9/2017 | Beckelman et al. | |
| 9,811,838 B1 | 11/2017 | Daire et al. | |
| 9,846,086 B1 | 12/2017 | Robinson et al. | |

(Continued)

FOREIGN PATENT DOCUMENTS

WO   2011/140130 A2   11/2011

OTHER PUBLICATIONS

C. Domokos, B. Séra, K. Simon, L. Kovács and T. Szakács, "Netfood: A Software System for Food Ordering and Delivery," 2018 IEEE 16th International Symposium on Intelligent Systems and Informatics (SISY), 2018, pp. 000143-000148, doi: 10.1109/SISY.2018.8524854. (Year: 2018).*

(Continued)

*Primary Examiner* — Michelle T Kringen
(74) *Attorney, Agent, or Firm* — Kwan & Olynick LLP

(57) ABSTRACT

Techniques for optimizing a food service configured to receive food orders from multiple customers, and consolidate orders based on respective days, times, and locations associated therewith. The food orders may include deliveries, customer pick-ups, and dine-in options for eating at a restaurant. The optimized food service may be configured to assign a restaurant to the consolidated orders and send a preparation instruction to the restaurant to prepare the consolidated orders for a designated pick-up or dining time. The optimized food service may additionally instruct an order supervisor to travel to the restaurant to assist in preparation of the consolidated orders. The order supervisor may additionally serve a food order, such as for a dine-in option or full service, catered delivery. For delivery orders, the optimized food service may assign a courier and, in some examples, a delivery assistant, to deliver the orders to respective customers.

18 Claims, 11 Drawing Sheets

(56) References Cited

U.S. PATENT DOCUMENTS

| | | |
|---|---|---|
| 9,858,614 B2 | 1/2018 | Seaward et al. |
| 10,133,995 B1 | 11/2018 | Reiss et al. |
| 10,181,111 B1 | 1/2019 | Kohli et al. |
| 10,346,889 B1 | 7/2019 | Reiss et al. |
| 2002/0138350 A1 | 9/2002 | Cogen |
| 2002/0143655 A1 | 10/2002 | Elston et al. |
| 2002/0178074 A1 | 11/2002 | Bloom |
| 2003/0125963 A1 | 7/2003 | Haken |
| 2005/0058755 A1 | 3/2005 | Chambers |
| 2005/0236478 A1 | 10/2005 | St. Clair et al. |
| 2006/0121161 A1 | 6/2006 | Garrett |
| 2006/0136237 A1 | 6/2006 | Spiegel et al. |
| 2006/0235754 A1 | 10/2006 | Walker et al. |
| 2006/0293971 A1 | 12/2006 | Hunter et al. |
| 2007/0168118 A1 | 7/2007 | Lappe et al. |
| 2007/0185776 A1 | 8/2007 | Nguyen et al. |
| 2007/0192111 A1 | 8/2007 | Chasen |
| 2008/0275643 A1 | 11/2008 | Yaqub et al. |
| 2009/0106124 A1 | 4/2009 | Yang |
| 2009/0187488 A1 | 7/2009 | Shamilian |
| 2009/0254445 A1 | 10/2009 | Bennett et al. |
| 2009/0281903 A1 | 11/2009 | Blatsein |
| 2009/0307096 A1 | 12/2009 | Antonellis |
| 2010/0076853 A1 | 3/2010 | Schwarz |
| 2010/0114790 A1 | 5/2010 | Strimling et al. |
| 2011/0055046 A1 | 3/2011 | Bowen et al. |
| 2012/0173308 A1 | 7/2012 | Brown et al. |
| 2012/0303425 A1 | 11/2012 | Katzin et al. |
| 2013/0080204 A1 | 3/2013 | Khorashadi et al. |
| 2013/0110396 A1 | 5/2013 | Choudhury |
| 2013/0151357 A1 | 6/2013 | Havas et al. |
| 2013/0218727 A1 | 8/2013 | Lutnick et al. |
| 2013/0226651 A1 | 8/2013 | Napper |
| 2014/0074743 A1 | 3/2014 | Rademaker |
| 2014/0095311 A1 | 4/2014 | Bulloch, Jr. |
| 2014/0164126 A1 | 6/2014 | Nicholas et al. |
| 2014/0180953 A1 | 6/2014 | Westcott et al. |
| 2014/0180959 A1 | 6/2014 | Gillen et al. |
| 2014/0188637 A1 | 7/2014 | Balasubramaniam et al. |
| 2014/0214465 A1 | 7/2014 | L'Heureux et al. |
| 2014/0222519 A1 | 8/2014 | Swinson et al. |
| 2014/0279081 A1 | 9/2014 | Marx et al. |
| 2014/0279667 A1 | 9/2014 | Gillen |
| 2014/0286150 A1 | 9/2014 | Miura |
| 2014/0297470 A1 | 10/2014 | Ramadge et al. |
| 2014/0310196 A1 | 10/2014 | Yamamura |
| 2014/0343841 A1 | 11/2014 | Faaborg et al. |
| 2014/0370167 A1 | 12/2014 | Garden |
| 2015/0095122 A1 | 4/2015 | Eramian |
| 2015/0112774 A1 | 4/2015 | Georgoff et al. |
| 2015/0178778 A1 | 6/2015 | Lee et al. |
| 2015/0206093 A1 | 7/2015 | Trew et al. |
| 2015/0227888 A1 | 8/2015 | Levanon et al. |
| 2015/0227890 A1 | 8/2015 | Bednarek et al. |
| 2015/0269521 A1 | 9/2015 | Knapp et al. |
| 2015/0286984 A1 | 10/2015 | Dikman et al. |
| 2015/0294265 A1 | 10/2015 | Monteverde |
| 2015/0324717 A1 | 11/2015 | Lord et al. |
| 2015/0324729 A1 | 11/2015 | Lord et al. |
| 2015/0332215 A1 | 11/2015 | Wilson et al. |
| 2015/0371317 A1 | 12/2015 | Bosko et al. |
| 2016/0019496 A1 | 1/2016 | Gorlin |
| 2016/0048804 A1 | 2/2016 | Paul et al. |
| 2016/0063435 A1* | 3/2016 | Shah ................. G07F 17/40 705/44 |
| 2016/0063438 A1 | 3/2016 | Shuken et al. |
| 2016/0071050 A1 | 3/2016 | Kaye |
| 2016/0171591 A1 | 6/2016 | Williams et al. |
| 2016/0196525 A1 | 7/2016 | Kantor et al. |
| 2016/0196528 A1 | 7/2016 | Lemmon |
| 2016/0292664 A1 | 10/2016 | Gilfoyle |
| 2017/0200218 A1 | 7/2017 | Napper |
| 2018/0022405 A1 | 1/2018 | Gecchelin et al. |
| 2018/0047242 A1 | 2/2018 | Lutnick et al. |
| 2018/0107977 A1* | 4/2018 | McHale ................. G06Q 10/10 |

OTHER PUBLICATIONS

"GPS Comes To High-Tech Pizza-Delivery Tracking; One Papa John's chain lets customers track their deliveries street by street. Domino's, meanwhile, is making its own tracking technology push," CMP Media, Inc., pp. 1-2 (Feb. 1, 2008).

Notice of Allowance dated Jun. 12, 2019, for U.S. Appl. No. 14/663,678, of Reiss, J. L., et al., filed Mar. 20, 2015.

Non Final Office Action dated Jul. 30, 2019, for U.S. Appl. No. 15/496,040, of Reiss, J. L., et al., filed Apr. 25, 2017.

Non-Final Office Action dated Jun. 24, 2015, in U.S. Appl. No. 14/663,671, of Reiss, J.L., et al., filed Mar. 20, 2015.

Final Office Action dated Dec. 24, 2015, in U.S. Appl. No. 14/663,671, of Reiss, J.L., et al., filed Mar. 20, 2015.

Advisory Action dated Mar. 9, 2016, in U.S. Appl. No. 14/663,671, of Reiss, J.L., et al., filed Mar. 20, 2015.

Non-Final Office Action dated Oct. 6, 2016, for U.S. Appl. No. 14/663,671, of Reiss, J.L., et al., filed Mar. 20, 2015.

Notice of Allowance dated Dec. 22, 2016, for U.S. Appl. No. 14/663,671, of Reiss, J.L., et al., filed Mar. 20, 2015.

Non-Final Office Action dated Nov. 9, 2017, for U.S. Appl. No. 14/625,673, of Reiss, J.L., et al., filed Feb. 19, 2015.

Non-Final Office Action dated Jan. 12, 2018, for U.S. Appl. No. 14/813,358, of Kohli, A., filed Jul. 30, 2015.

Non-Final Office Action dated Feb. 1, 2018, for U.S. Appl. No. 14/993,149, of Kohli, A., et al., filed Jan. 12, 2016.

Non-Final Office Action dated Mar. 8, 2018, for U.S. Appl. No. 14/663,678, of Reiss, J.L., et al., filed Mar. 20, 2015.

Non-Final Office Action dated Apr. 2, 2018, for U.S. Appl. No. 14/926,056, of Bernstein, B.R., et al., filed Oct. 29, 2015.

Notice of Allowance dated Jun. 25, 2018, for U.S. Appl. No. 14/625,673, of Reiss, J.L., et al., filed Feb. 19, 2015.

Non-Final Office Action dated Jul. 13, 2018, for U.S. Appl. No. 14/710,808, of Reiss, J.L., et al., filed Oct. 29, 2015.

Final Office Action dated Jul. 23, 2018, for U.S. Appl. No. 14/663,678, of Reiss, J.L., et al., filed Mar. 20, 2015.

Notice of Allowance dated Sep. 6, 2018, for U.S. Appl. No. 14/993,149, of Kohli, A., et al., filed Jan. 12, 2016.

Final Office Action dated Oct. 17, 2018, for U.S. Appl. No. 14/926,056, of Bernstein, B.R., et al., filed Oct. 29, 2015.

Final Office Action dated Nov. 16, 2018, for U.S. Appl. No. 14/813,358, of Kohli, A., filed Jul. 30, 2015.

Non Final Office Action dated Dec. 17, 2018, for U.S. Appl. No. 14/663,678, of Reiss, J.L., et al., filed Mar. 20, 2015.

Advisory Action dated Jan. 29, 2019, for U.S. Appl. No. 14/926,056, of Bernstein, B.R., et al., filed Oct. 29, 2015.

Notice of Allowance dated Feb. 25, 2019, for U.S. Appl. No. 14/710,808, of Reiss, J.L. et al., filed May 13, 2015.

EIC 3600 Search Report dated Feb. 25, 2019, for U.S. Appl. No. 14/710,808, of Reiss, J.L. et al., filed May 13, 2015.

Non Final Office Action dated Apr. 4, 2019, for U.S. Appl. No. 14/813,358, of Kohli, A., filed Jul. 30, 2015.

* cited by examiner

FOOD DELIVERY OPTIMIZATION

BACKGROUND

Traditional food services are generally limited in scope and in a number of customers they can service at once. In a traditional food-service application, a customer may submit a single, day-of order for food to be delivered to a customer location. The delivery service may pick up the food at a restaurant and deliver it to the customer location to complete the order. To receive another order for food, such as on the same day the following week, the customer would have to submit another single, day-of order for food. Additionally, traditional food services are typically configured to service customer orders one at a time, and for a limited number of people per order. Thus, if the customer is feeding a large group of people, such as more than a dozen people, the traditional food services may be unable to fulfill the order.

To feed large groups of people, customers may hire a catering company to service a food request. However, catering companies typically use a single chef and a single supply chain for ingredients for each catered event. Thus, food from a catering company might not include a lot of variety, thereby decreasing customer satisfaction over time. To increase variety, the customer may hire different catering companies for different events. However, hiring different catering companies, like traditional food services, requires the customer to submit orders for each catered event, thereby increasing workload of the customer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
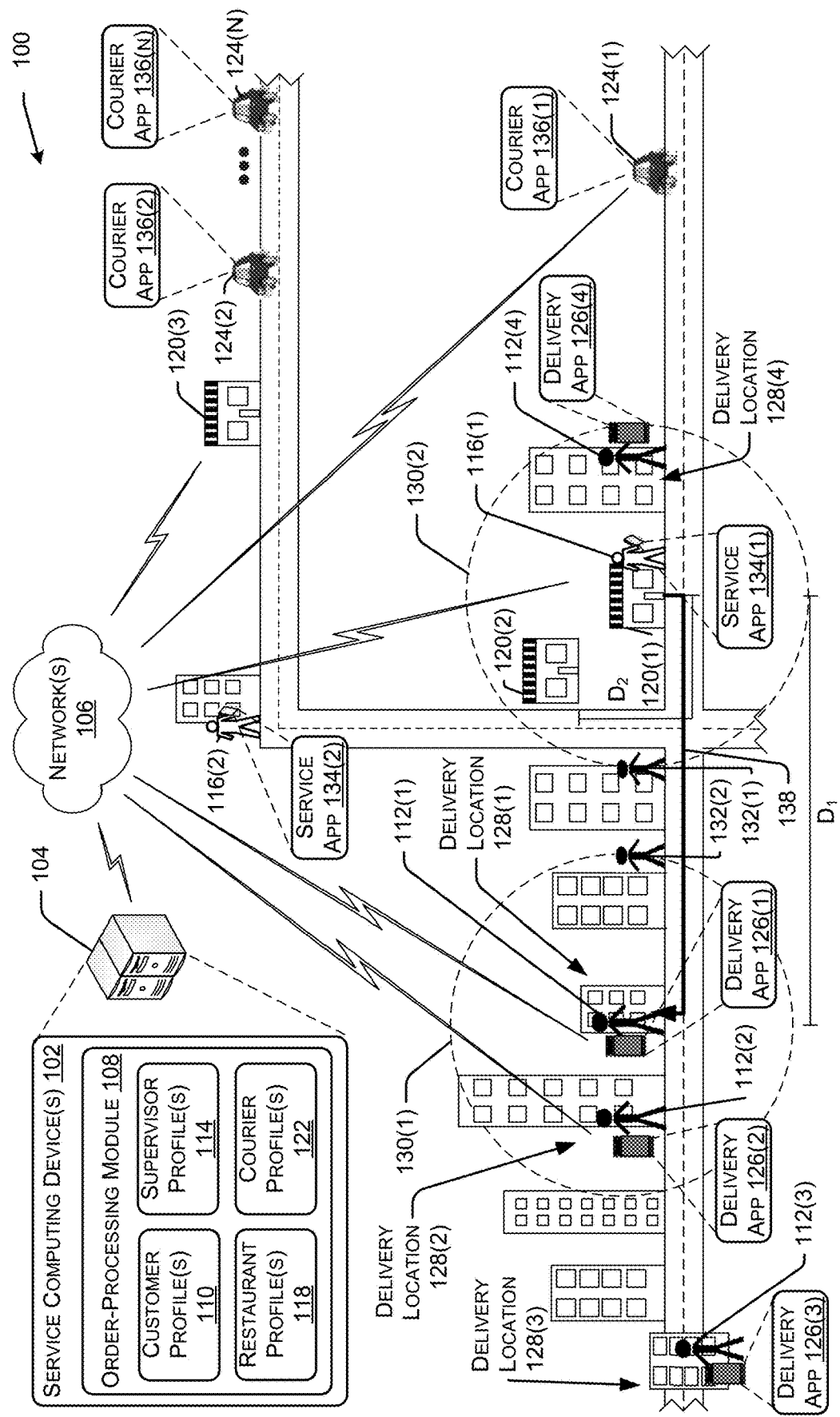
FIG. 1 illustrates an example environment of an optimized food service system.

Techniques described herein are directed to an optimized order service that is configured to receive orders from multiple customers, and consolidate orders based on respective days, times, and locations associated therewith. One type of order served by the service is a food order. Thus, an optimized food service may be configured to assign an order supervisor to assist in preparation of a set of orders and ensure quality control thereof. The optimized food service may additionally be configured to assign a courier to deliver one or more orders to respective customers.

Techniques described herein are directed to leveraging information associated with customers, restaurant merchants, food service assistants, and delivery personnel to intelligently optimize a food service. In various examples, the food service may receive customer data (e.g., delivery location, meal headcount (e.g., a number of people to be fed, number of consumers), contact information, etc.), food data (e.g., preferences, allergies (e.g., peanut, shellfish, soy, milk, gluten, etc.), dietary restrictions (e.g., religious, vegan, vegetarian, etc.), etc.), delivery data (e.g., day(s), time, special instructions for delivery, etc.), and/or a type of service (e.g., full service (i.e., white glove catering-type service), drop-off service, etc.) from customers. In some examples, the customer data, food data, delivery data, and/or type of service may be received concurrently with a food delivery order submission. In some examples, the customer data, food data, delivery data, and/or type of service may be received prior to a food delivery order submission. For example, the customer may establish a profile with the food service. In the profile, the customer may submit a recurring drop-off meal order for 27 people on Fridays, to be delivered at 11 am. The profile may indicate a preference for ethnic cuisine, with three vegetarians, and no allergies. The food service may store the customer data, food data, delivery data, and/or type of service in a customer profile.

The food service may receive a food delivery order submission (e.g., an order), and may identify and assign a restaurant to prepare the food for one or more orders received from one or more customers. In some examples, the restaurant may be assigned to the order(s) based on a relative proximity of the restaurant to respective delivery locations. In various examples, the restaurant may be assigned to each order based on the customer data, the food data, the type of service requested by respective customers, and/or other factors associated with the order(s). For example, the food service may assign a Chinese restaurant to prepare the order based on a customer preference for Asian food. For another example, the food service may assign a vegan delicatessen to prepare the order based on a designated dietary restriction for a majority of the consumers associated with the customer. In various examples, the order(s) assigned to a particular restaurant may be batched together, based at least in part on respective delivery times and/or delivery locations associated therewith. For example, three orders assigned to a restaurant, with delivery times within 15 minutes of one another, may be batched together for preparation.

In some examples, the food service may automatically assign the restaurant based on the customer data, food data, and/or the type of service requested. In various examples, the food service may send a message to the customer, requesting approval of the restaurant prior to assignment thereof to the order. In such examples, the food service may assign the restaurant responsive to receiving approval of the restaurant or responsive to not receiving a disapproval of the restaurant, such as within a threshold amount of time after sending the approval request message.

Based on an assignment of the restaurant, and in some examples, an approval thereof, the food service may generate a food preparation message (e.g., food preparation instruction) and send the food preparation message to the assigned restaurant. The food preparation message may include an instruction for the restaurant to prepare food associated with the order(s) for the customer(s). The food preparation message may include customer data and/or food data relevant to the preparation of each order. For example, the food preparation message may include an instruction to prepare a first order including meals for 25 people, including 7 beef meals, 13 chicken meals, 2 fish meals, and 3 vegetarian meals, and a second order including meals for 14 people, including an even mix of beef and chicken. In some examples, the food preparation message may include particular meals to prepare, such as 7 servings of beef stroganoff, 13 servings of chicken cacciatore, 2 servings of fish and chips, and 3 servings of pesto pasta.

In some examples, the food preparation message may include a serving size for a particular customer. In some examples, the serving size may be based on customer input, such as in the customer data. For example, the customer may request ½ lb. of meat and two sides for each person to be served (e.g., meal headcount). In some examples, the serving size may be based on feedback from previous orders. In such examples, the food service may receive input regarding an amount (e.g., weight) of food delivered and an amount of food leftover after meal completion. The food service may track the difference and determine a serving size per person for the particular customer. In some examples, the serving size per person may be stored in a customer profile for the particular customer.

The food preparation message may include a pick-up time for delivery, to inform the restaurant when to have the order prepared by. In various examples, the pick-up time may include a window of time (e.g., no earlier than time and no later than time) for meal preparation. For example, the food preparation message may instruct the restaurant to have the food ready no earlier than 11:55 and no later than 12:05.

In various examples, the food preparation message may include information about an order supervisor (e.g., food service assistant, order assistant, etc.) designated to assist with preparation and/or quality control of order and/or interactions with arriving couriers and/or customers. Additionally, the food service may send a notification to the order supervisor, instructing the order supervisor to travel to the restaurant and assist in food preparation and/or quality control of the order(s). In some examples, the notification may include a time associated with the start of food preparation, the pick-up time, an address or other location associated with the restaurant, the name of the restaurant, a point of contact at the restaurant (e.g., manager, chef, sous chef, or other employee of the restaurant), meal information, and/or other information pertinent to the preparation and/or delivery of the order(s).

In various examples, at a first interval (e.g., a week prior, 3 days prior, 1 day prior, 8 hours prior, 2 hours prior, etc.) prior to the designated pick-up time, the food service may identify one or more couriers for delivery of one or more orders prepared by the restaurant. In some examples, the food service may identify a courier for each order in a batch of orders (e.g., one or more orders) prepared by the restaurant. Identifying a single or multiple couriers for the batch of orders may be based on proximity of delivery locations (e.g., locations associated with the customers), proximity of time for order delivery, a size of an order, delivery instructions, traffic and/or parking considerations (e.g., known traffic patterns, typical parking availability at or near the delivery location, etc.), weather considerations, existence of a delivery assistant, or the like. For example, the food service may determine that three food delivery orders batched and prepared by a restaurant each include complex delivery instructions, the delivery locations are each located in high-density traffic areas, and the three orders need to be delivered within 10 minutes of one another. The food service may identify three different couriers to deliver the three food delivery orders.

In some examples, the food service may additionally identify a delivery assistant to assist the courier(s) in delivering the order(s). In some examples, the delivery assistant may be an employee of the food service. In other examples, the delivery assistant may be a contractor, performing work under contract for the food service. The delivery assistant may be identified based on delivery instructions, high density traffic areas, timing associated with deliveries of multiple orders, or the like. For example, in a high-density traffic area, such as in a metropolitan city, parking may be challenging. Thus, the food service may assign a delivery assistant to the courier, to allow the courier to remain with the vehicle during order drop-off. In various examples, the order supervisor may serve as the delivery assistant, and may accompany the courier to the delivery location(s).

In various examples, the food service may verify availability of each identified courier and/or each identified delivery assistant prior to a pick-up time associated with one or more orders. In such examples, the food service may send a message to a computing device associated with each identified courier and/or each identified delivery assistant including the date, time, and details regarding delivery of one or more orders, along with a request to accept or decline the delivery.

In some examples, the food service may send each identified courier and/or each identified delivery assistant a notification of a pending pick-up at a second interval (e.g., 1.5 hours, 1 hour, 30 minutes, 15 minutes, etc.) prior to the pick-up time or delivery time. In such examples, the notification of the pending pick-up may serve as a reminder for the courier and/or delivery assistant to deliver the one or more orders.

As discussed above, the food service may receive orders for full service and drop-off service food delivery. In examples in which the customer requests a drop-off service, the courier may deliver the order to the designated location, and the customer may set up and serve the food. In some examples, the order may include packaging instructions for the customer to package up remaining service items and/or leftover food for subsequent pick-up. In some examples, an order supervisor may be assigned to travel to the delivery location and package up remaining service items and/or leftover food. The order supervisor at the delivery location may be the same or a different order supervisor from the order supervisor who assisted in preparing the order(s) at the restaurant.

In various examples, the order supervisor may return the remaining service items and/or leftover food to a location associated with the food service (e.g., a food service center). In some examples, the food service may assign a courier to return to the delivery location for the subsequent pick-up. In such examples, the courier may pick-up the remaining service items and/or leftover food at the delivery location and deliver them to the food service center. The courier assigned to the subsequent pick-up may be the same or a different courier from the courier who delivered the order. In various examples, the food service may send a notification to the courier for the subsequent pick-up. In such examples, the notification may include the location associated with the subsequent pick-up, special instructions, and location information for the food service center.

In various examples, the original notification of the pending pick-up, sent prior to order pick-up at the restaurant, may include information about the subsequent pick-up, to put the courier on notice that a future pick-up will be required. In such examples, the original notification of food delivery may include a return time, indicating when the courier should return to the delivery location and pick-up remaining service items and/or leftover food, and deliver them to a food service center. In some examples, the return time may include a window of time at an interval (e.g., 2 hours, 3 hours, etc.) after the delivery time. For example, for a scheduled delivery at 12:30 pm, the return time may be 3:30 pm.

In examples in which the customer requests full service, an order supervisor may receive the order from the courier at delivery and may set up and serve the food. In some examples, the food service may inform the order supervisor about the service, such as, for example, via a message, notification, an application, website, or other means by which the food service may inform the order supervisor of duties associated with service. In various examples, the food service may additionally inform the order supervisor about a means of transportation to the delivery location. In some examples, the order supervisor may travel to the delivery location with the courier, such as from the restaurant or an intermediate location on the route from the restaurant to the delivery location(s). In some examples, the courier may receive a notification to stop at the intermediate location and pick up the order supervisor en route to the delivery location. In such examples, the notification may be included in the notification of the pending pick-up, or it may be a separate notification. In some examples, the order supervisor may travel to the delivery location separate from the courier, such as, for example, via a personally operated vehicle, public transit, private transit, or the like. The order supervisor at the delivery location may be the same or a different order supervisor from the order supervisor who assisted in preparing the order(s) at the restaurant.

At the completion of the full-service meal, the order supervisor may package the remaining service items and/or leftover food for transportation back to the food service center. In some examples, the order supervisor may perform the delivery of the remaining service items and/or leftover food to the food service center. In some examples, the food service may identify and contact (e.g., send a notification to) a courier to perform the subsequent pick-up of the remaining service items and/or leftover food. The courier assigned to the subsequent pick-up may be the same or a different courier from the courier who delivered the order.

The technical problem addressed by this application is that typical food service systems are generally not configured to communicate and share data with sufficient entities in order to prepare, deliver, and serve large orders for customers, and are not designed with quality control mechanisms in place. The technical solution, therefore, is collecting data from multiple sources and coordinating multiple individuals in order to optimize a food delivery system capable of preparing, delivering, and serving orders for customers with high quality control.

Furthermore, unlike traditional food service systems, which require customers to get online and place an order each time they want food delivered, the optimized food service is configured to process recurring orders for a particular customer to a high degree of customer satisfaction. Because the customer need not place an order for each and every delivery instance, the optimized food delivery techniques described herein require fewer network transmissions to complete orders, thereby leading to increased bandwidth being available for other network traffic.

For the purposes of this discussion, the order supervisor (e.g., order assistant) may be an employee of the food service. An employee may include a person who is hired for a wage, salary, fee or payment to perform work for an employer. The employee may be considered an agent of the employer, the principal. Additionally, for the purposes of this discussion, the order assistant may be a person who is contracted to perform services for an entity (e.g., the food service) under a contract between the contractor and the entity, with terms specified in the contract, such as the amount and type of work involved, pay, and/or other terms. For the purposes of this discussion, the courier may be an employee of the food service. An employee may include a person who is hired for a wage, salary, fee, or payment to perform work for an employer. The employee may be considered an agent of the employer, the principal. Additionally, for the purposes of this discussion, the courier may be a person who is contracted to perform services for an entity (e.g., the food service) under a contract between the contractor and the entity, with terms specified in the contract, such as the amount and type of work involved, pay, and/or other terms. For the purposes of this discussion, the delivery assistant may be an employee of the food service. An employee may include a person who is hired for a wage, salary, fee, or payment to perform work for an employer. The employee may be considered an agent of the employer, the principal. Additionally, for the purposes of this discussion, the delivery assistant may be a person who is contracted to perform services for an entity (e.g., the food service) under a contract between the contractor and the entity, with terms specified in the contract, such as the amount and type of work involved, pay, and/or other terms.

FIG. 1 illustrates an example environment 100 of an optimized food delivery system configured to provide efficient and intelligent food service with a high degree of customer satisfaction. The optimized food delivery system may include a service computing device 102. In various examples, the service computing device 102 may be configured to communicate with other devices in a distributed computing resource 104. Service computing device 102 may include a variety of device types configured to communicate via one or more networks 106 and are not limited to a particular type of device. In some examples, device 102 may include stationary devices, including but not limited to servers, desktop computers, personal computers, work stations, and thin clients, such as those capable of operating in a distributed computing resource. In some examples, service computing device(s) 102 may include mobile devices, including but not limited to mobile phones, tablet computers, laptop computers, and any other mobile computers or mobile telecommunication devices. In various examples, service computing device(s) 102 may include any other sort of computing device configured to communicate via the one or more networks 106.

In various examples, network(s) 106 may include public networks such as the internet, private networks such as an institutional and/or personal network or some combination of public and private networks. Network(s) 106 may also include any type of wired and/or wireless network, including but not limited to local area networks (LAN), wide area networks (WAN), satellite networks, cable networks, Wi-Fi networks, WiMax networks, mobile communications networks (e.g., 3G, 4G, etc.), or any combination thereof. Network(s) 106 may utilize communications protocols, including packet-based and/or datagram-based protocols, such as internet protocol (IP), transmission control protocol (TCP), user datagram protocol (UDP), or other types of protocols. Moreover, network(s) 106 may also include a number of devices that facilitate network communications and/or form a hardware basis for the networks, such as switches, routers, gateway access points, firewalls, base stations, repeaters, backbone devices, and the like.

In some examples, network(s) 106 may further include devices that may enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the service computing device 102 may include an order-processing module 108. The order-processing module 108 may be configured to receive information from various sources, and store the information about respective sources in one or more profiles, such as, for example, in customer profile(s) 110 associated with customers 112, captain profile(s) 114 associated with order supervisors 116, restaurant profile(s) 118 associated with restaurants 120, and/or courier profile(s) 122 associated with couriers 124. The order-processing module 108 may process the information stored in the customer profile(s) 110, the captain profile(s) 114, the restaurant profile(s) 118, and/or the courier profile(s) 122, and efficiently schedule food preparation, delivery, service, and/or service clean-up for a customer.

As illustrated in FIG. 1, the service computing device 102 may receive information for storage in the customer profile (s) 110 via a delivery application 126 on a customer computing device, and via the network(s) 106. In some examples, the service computing device 102 may receive the information for storage in the customer profile(s) 110 via a website associated with the food service, or other means by which the customer 112 may transmit a request for and/or information regarding food delivery. The customer profile(s) 110 may include customer data (e.g., delivery location, meal headcount (i.e., a number of food consumers), contact information, etc.), food data (e.g., preferences, allergies (e.g., peanut, shellfish, soy, milk, gluten, etc.), dietary restrictions (e.g., religious, vegan, vegetarian, etc.), etc.), delivery data (e.g., day(s), time, special instructions for delivery, etc.), and/or a type of service (e.g., full service (i.e., white glove catering-type service), drop-off service, etc.).

In some examples, the customer 112(1) may sign up for an account with the food service. In such examples, the customer 112(1) may provide customer data, food data, delivery data, and/or type of service desired to the service computing device 102, for storage in the customer profile 110 associated with the customer 112(1), such as, for example, for future processing of a service request. The service request may include a request for food delivery (e.g., food service request), food delivery and service, meal preparation for customer pick-up, and/or meal preparation and service at a restaurant. In various examples, a customer 112(1) may submit a service request via the delivery application 126, a food service website, or other means. The service request may include customer data, food data, delivery data, and/or a type of service. The service computing device 102 may store the information in a customer profile 110 associated with the customer 112(1).

Responsive to receiving the service request from the customer computing device associated with the customer 112(1), the order-processing module 108 may process the service request. The order-processing module 108 determine a day (e.g., day of the week for recurring orders, date for a single order, etc.), time (e.g., requested delivery time), and a delivery location 128(1) associated with the service request. In various examples, the order-processing module 108 may determine whether the service request may be batched for delivery with another service request.

In some examples, two or more service requests may be batched if they are scheduled on a same day and include requested delivery times within a threshold time (e.g., within 10 minutes, 15 minutes, etc.) of one another. In various examples, a first service request, such as from customer 112(1) may be batched with a second service request, such as from customer 112(2) may be batched if they are within a threshold distance (e.g., 5 city blocks, ½ mile, 1 mile, 5 miles, etc.) from one another. In some examples, a second service request, such as from customer 112(2) may be batched with the first service request, such as from customer 112(1) if the second delivery location 128(2) is within the threshold distance, illustrated as distance 130(1), from the first delivery location 128(1).

The order-processing module 108 may identify assign a restaurant 120, such as restaurant 120(1), to the service request submitted by customer 112(1). In various examples, the restaurant 120(1) may be assigned based on a location associated with the restaurant being within a distance $D_1$ from the delivery location 128(1). In some examples, the restaurant 120(1) may be assigned based on customer data and/or food data associated with the customer. For example, the customer 112(1) may include a food preference for ethnic food, and the order-processing module 108 may assign the restaurant 120(1) serving Ethiopian cuisine, to the service request.

In various examples, two or more service requests may be batched if they are assigned to a same restaurant 120, such as restaurant 120(1). In some examples, a service request, such as from customer 112(4) may be batched with other service requests, such as from customer 112(1) and 112(2), if the delivery location 128(4) associated with customer 112(4) is within a threshold distance (illustrated as distance 130(2)) of the restaurant 120(1) assigned to the service requests for each of customers 112(1), 112(2), and 112(4).

In some examples, two or more service requests may be associated with one another for delivery (not preparation) if they are assigned to restaurants 120(1) and 120(2) that are within a distance $D_2$ (e.g., 3 blocks, 0.5 miles, 1 mile, 3 miles) from one another. For example, a first restaurant 120(1) may be assigned to a first order and a second restaurant 120(2) may be assigned to a second order for respective order preparation. The service computing device 102 may determine that the first restaurant 120(1) and second restaurant 120(2) are within the distance D2 of one another, and may determine that the first order and the second order may be delivered by a single courier 124, such as courier 124(1).

In various examples, the service computing device 102 may send a food preparation message (e.g., food preparation instruction) to the restaurant, instructing the restaurant to prepare the one or more batched order(s). In some examples, the food preparation message may include an instruction for the restaurant 120 to prepare orders associated with the batched order(s) for pick-up at a pick-up time on the delivery day/date or for consumption at the restaurant, if the customer 112 selects a dine-in option. In various examples, the service computing device 102 may be configured to determine the pick-up time based on a delivery time requested by the customer. The pick-up time may be determined based on a distance from a location associated with the restaurant to a first delivery location 128(1) (illustrated as $D_1$), known traffic patterns, known parking considerations (e.g., parking availability proximate to the delivery location), weather considerations, a scheduled delivery assistant 132 or order supervisor 116 to accompany courier 124, or the like.

In some examples, the service computing device 102 may send the food preparation message to the restaurant 120 at an interval prior to the scheduled pick-up and/or scheduled delivery time. The interval may be hours, days, and/or weeks prior to the scheduled pick-up and/or scheduled delivery time. In some examples, the service computing device 102 may send the food preparation message to the restaurant at least a day prior to the scheduled pick-up and/or scheduled delivery time, to provide the restaurant with enough time to adequately staff for an expected number of meal preparations. In various examples, the interval may be determined based on a preference stored in a restaurant profile associated with the restaurant. In some examples, the interval may be determined based on a number of batched orders sent to the restaurant and/or a number of orders associated with each batched order. In some examples, the interval may be determined based on a day of the week on which the order is scheduled. For example, a manager of a restaurant 120(1) may submit a preference to receive batched order(s) to be delivered during a work week (e.g., Monday-Friday) at least three days prior to the delivery date, if the batched order(s) include more than 25 meal headcounts total (e.g., one batched order including 3 orders with 10, 15, and 11 meal headcounts, respectively, two batched orders including 2 orders with 13 and 14 meal headcounts, respectively, and 3 orders with 9, 12, and 16 meal headcounts, respectively, etc.). In some examples, such as if the batched order is sent in advance of the delivery day, the service computing device 102 may be configured to send a reminder message to the restaurant computing device associated with the restaurant on the day of pick-up/delivery. In some examples, the service computing device 102 may cause the reminder message to surface on restaurant computing device, such as via the restaurant application. In some examples, the service computing device 102 may cause the reminder message to surface, such as via a pop-up message, text message, messaging application notification, or the like.

In various examples, the service computing device 102 may identify an order supervisor 116 (e.g., assistant) to assist in preparation of a set of service requests (e.g., batched orders) at a restaurant 120, such as restaurant 120(1). In some examples, the order supervisor 116, such as order supervisor 116(1), may be identified based on availability on a work schedule. In such examples, the service computing device 102 may access the work schedule on a captain profile 114 associated with the order supervisor 116(1). In some examples, the order supervisor 116 may be identified based on an assigned and/or preferred region (e.g., neighborhood, district, etc.) in which the order supervisor 116 operates. For example, an order supervisor 116(1) may be assigned to work in the Central Market district of San Francisco. Responsive to determining that a set of orders is assigned to a restaurant 120(1) in the Central Market district and/or that the delivery locations 128, such as delivery locations 128(1) and 128(2), are located in the Central Market district, the service computing device 102 may identify the order supervisor 116(1) as the one to assist in preparation of the batched orders.

In various examples, the service computing device may identify the order supervisor 116 based on one or more preferences associated with the order supervisor 116(1). The one or more preferences may include a preference for a restaurant, a preference for preparing a certain type of food, a preference for a type of service (e.g., white glove, drop-off, etc.), order supervisor allergies (e.g., peanut, soy, etc.), and/or other preferences or details stored in a captain profile 114 associated with the order supervisor 116(1). For example, an order supervisor 116(1) may be allergic to peanuts. Based on the peanut allergy, the order supervisor 116(1) may not be assigned to assist in preparing food at a restaurant 120 serving Thai food.

Responsive to identifying an order supervisor 116(1) for a batched order, the service computing device 102 may schedule the order supervisor 116(1). As will be discussed in greater detail below with regard to FIG. 4, the service computing device 102 may schedule the order supervisor 116(1) and cause the schedule to be displayed via a service application 134 on a computing device associated with the order supervisor 116(1) (e.g., order supervisor computing device, assistant computing device). The service application 134 may include a daily, weekly, and/or monthly schedule for the order supervisor 116(1). In various examples, the service application 134 may provide information associated with each assigned batched order. In various examples, the schedule and/or information associated with each assigned batched order may be provided to the order supervisor 116(1) via a website or other platform for interaction between the service computing device 102 and an order supervisor 116(1), such as via the captain computing device.

In various examples, the service computing device 102 may identify one or more couriers 124 to deliver the one or more orders in a batched order. In such examples, more than one courier 124 may be identified based on proximity of delivery locations (e.g., locations associated with the customers), proximity of time for order delivery, a size of an order, delivery instructions, traffic considerations (e.g., known traffic patterns, density of traffic, etc.) and/or parking considerations (e.g., typical parking availability at or near the delivery location), weather considerations, scheduled of a delivery assistant 132 or order supervisor 116 to accompany the courier 124, or the like. For example, the service computing device 102 may determine that a first order for customer 112(1) has a first delivery time of 12:30 and a second order for customer 112(2) has a second delivery time of 12:45. The service computing device 102 may determine that the first delivery time and the second delivery time are adequately spaced, considering traffic, parking considerations, and delivery instructions, to deliver the first order at the first delivery location 128(1), then travel to and to deliver the second order at the second delivery location 128(1) in time.

In various examples, the service computing device 102 may send a request for delivery services to the one or more identified couriers 124 for the batched order. In various examples, the service computing device 102 may send the request for delivery services via a courier application 136. In some examples, the service computing device 102 may send the request for delivery services via a website or other means by which the service computing device 102 may communicate with a courier computing device (e.g., electronic mail, text message, messaging application, telephone call, etc.). In some examples, the request for delivery services may be sent hours, days, and/or weeks before the day and/or time associated with delivery of the one or more orders of the batched order. In such examples, the courier(s) 124 may be able to schedule the delivery in advance. In some examples, the request for delivery services may include a means by which the identified courier(s) 124 may accept or deny respective deliveries. For example, the service computing device 102 may cause the request to automatically surface on a display of the courier computing device, such as via the courier application 136, a messaging application, or the like. The request may include details regarding the delivery (e.g., date, pick-up time, delivery time, restaurant location, delivery location, etc.) and a selectable option to accept or deny the delivery. Responsive to receiving a selection to accept or deny the delivery, the service computing device may schedule the courier 124(1), or identify a different courier 124(N) to deliver the order(s).

Additionally, the service computing device 102 may identify one or more delivery assistants 132 to assist the courier(s) 124 in order delivery. The delivery assistant(s) 132 may be identified based on delivery instructions, high density traffic areas, timing associated with deliveries of multiple orders, or the like. For example, a delivery location 128, such as delivery location 128(1) may provide no legal opportunity for parking within a reasonable distance (e.g., one block, 3 blocks, 5 blocks, etc.). As such, the service computing device 102 may determine that the courier 124 may need a delivery assistant 132 to provide the order to the customer (e.g., perform the physical delivery) while the courier 124 remains with a vehicle associated therewith. For another example, the service computing device 102 may determine that the delivery times associated with a first order, such as for customer 112(1), and a second order, such as for customer 112(2), in a batched order, are not spaced apart sufficiently based on traffic and parking considerations for the courier to deliver the first order at the first delivery location 128(1), travel to the second delivery location 128(2), and deliver the second order at the second delivery location 128(2). Based on the determination that the delivery times are too close together, the service computing device 102 may identify a first delivery assistant(s) 132(1) to deliver the first order and a second delivery assistant 132(2) to deliver the second order.

In some examples, the delivery assistant(s) 132 may be identified based on availability (e.g., a schedule of availability). In some examples, the delivery assistant(s) 132 may be identified based on a location associated with the delivery assistant(s) 132. The location may be determined based on a location device of a computing device associated with the delivery assistant 132 (e.g., delivery assistant computing device). For example, the delivery assistant(s) 132 may be identified to assist in delivery based at least in part on the location associated with the delivery assistant 132 being along a route 138 between the restaurant 120(1) and the delivery location 128(1).

In various examples, the service computing device 102 may send a request for services to the delivery assistant computing device. Similar to the request for courier services described above, the service computing device 102 may send the request via an application, text message, phone call, or other means by which the service computing device 102 may request services. The request may include a means by which the delivery assistant(s) 132 may accept or deny the request. In some examples, the service computing device 102 may cause the request, along with a selectable option to accept or deny the request, to surface on a display of a delivery assistant computing device.

In various examples, the service computing device 102 may be configured to send a preparation message (e.g., assistance instruction) to the order supervisor 116 at a first interval prior to the pick-up time at the restaurant, an estimated time associated with a start of food preparation at the restaurant, or the like. The preparation message may include an instruction for the order supervisor 116 to travel to the restaurant 120 to assist in preparation of one or more batched orders, perform quality control measures, or the like. The quality control measures may include measuring serving sizes, verifying proper packaging, verifying a number of meals per order, ensuring allergy and/or dietary restriction considerations have been met, and/or other measures to ensure high quality standards are met. In some examples, the preparation message may include an instruction to verify partial cooking of an order (e.g., not fully cooked order) for delivery or customer pick-up. In such examples, an order supervisor 116, courier 124, delivery assistant 132, or customer 112 may complete the cooking at the delivery location 128 and/or other location associated with the customer 112. In some examples, a partially cooked order may be packaged for delivery by a courier 124 or pick-up by a customer 112. In some examples, the partially cooked order maybe packaged as a meal kit and may include instructions on cooking completion, implements required for preparation and/or consumption (e.g., plasticware, silverware, etc.), or the like. In some examples, the order supervisor 116 assisting in order preparation may ensure the instructions on cooking completion are included with the order.

In various examples, the preparation message may inform the order supervisor 116 that the customer 112 will pick-up the order at the restaurant 120 or that the customer 112 is requesting a dine-in option. The dine-in option may include the customer 112 traveling to the restaurant 120 to eat a meal on site. In some examples, the preparation message may include information about a number of people accompanying the customer 112 (e.g., number of consumers), order details, a serving time(s) (e.g., customer's requested time to dine) for each course to be served, seating requests, or the like. In such examples, the order supervisor 116 may assist in preparing the order and may ensure the customer's requests are satisfied.

In some examples, the service computing device 102 may be configured to cause the preparation message to surface on the captain computing device, such as via a pop-up message, text message, messaging application notification, or the like. The first interval may be an hour, two hours, 30 minutes, 45 minutes, etc., prior to the pick-up time at the restaurant, the estimated time associated with a start of food preparation at the restaurant, or the like. The first interval may be determined by the service computing device 102 based on a distance between the order supervisor 116 and restaurant 120. In such examples, the service computing device may receive location data from the order supervisor computing device and may calculate the distance between the order supervisor 116 and the restaurant 120. In some examples, the first interval may be determined based on known or current traffic considerations, parking considerations, weather considerations, a type of transit used by the order supervisor 116 (e.g., personally operated vehicle, public transportation, private transportation, etc.), or the like.

In some examples, the customer 112 may opt to pick-up the order at the restaurant 120. In some examples, the service computing device 102 may be configured to send a preparation completion message to the customer computing device. In such examples, the preparation completion message may include information about the meal, a location within the restaurant to pick-up, cooking completion instructions for partially cooked meals, meal warming instructions, or the like. In some examples, the preparation completion message may be sent to the customer computing device at or within a threshold time (e.g., 5 minutes, 10 minutes, 15 minutes, etc.) of the pick-up time. In some examples, the preparation completion message may be sent at the threshold time associated with a calculated distance from the customer 112 to the restaurant. In some examples, the service computing device 102 may access a location associated with the customer, such as in a customer profile 110, and may use that to calculate the distance to the restaurant. In some examples, the service computing device 102 may receive location information from the customer computing device, such as from a location device of the customer computing device. In such examples, the service computing device 102 may use the location information to determine the distance to the restaurant 120.

In various examples, the service computing device 102 may be configured to send a delivery message to the courier 124 at a second interval prior to the pick-up time at the restaurant. The delivery message may include a reminder to pick-up the batched order at the restaurant 120 and deliver it to the delivery location 128. In some examples, the delivery message may include information regarding the restaurant 120 and delivery location(s) 128, such as, for example, delivery instructions associated with the customer 112, such as those stored in a customer profile 110. In some examples, the service computing device 102 may be configured to cause the preparation message to surface on the courier computing device, such as via a pop-up message, text message, messaging application notification, or the like. The second interval may be an hour, two hours, 30 minutes, 45 minutes, etc., prior to the pick-up time at the restaurant. The second interval may be the same as or different from the first interval. The second interval may be determined by the service computing device 102 based on a distance between the courier 124 and restaurant 120. In such examples, the service computing device 102 may receive location data from the courier computing device and may calculate the distance between the courier 124 and the restaurant 120. In some examples, the interval may be determined based on known or current traffic considerations, parking considerations, or the like.

In various examples, the service computing device 102 may be configured to update the pick-up time on the day of delivery. In such examples, the service computing device may monitor one or more of the determinative factors (e.g., current or real-time traffic, construction, parking availability, weather, or other factors that may slow the courier on the route 138 to the delivery location 128) for the pick-up time and may update the pick-up time based on a change to one or more determinative factors. In some examples, the service computing device 102 may be configured to send a timing update message to the restaurant computing device associated with the restaurant 120 on the day of pick-up/delivery. In some examples, the service computing device 102 may cause the timing update message to surface on restaurant computing device, such as via the restaurant application. In some examples, the service computing device 102 may cause the timing update message to surface, such as via a pop-up message, text message, messaging application notification, or the like. For example, the service computing device 102 may determine that an injury accident has occurred along a route 138 from an identified restaurant 120(1) and the first delivery location 128(1). The service computing device 102 may determine a re-route is necessary for delivery and may adjust the pick-up time based on the re-route. Responsive to determining an adjusted pick-up time, the service computing device 102 may send a timing update message to the restaurant computing device, order supervisor computing device, and/or courier computing device.

In some examples, the courier 124 may stop along the route 138 from the restaurant 120 to the delivery location 128, to pick up one or more scheduled (e.g., identified) delivery assistant(s) 132. In such examples, the courier 124 may be notified by the service computing device 102, such as, for example, by a text message, pop-up notification, or the like, to pick up the delivery assistant(s) 132 at a location(s) associated therewith. In some examples, the location(s) associated with the delivery assistant(s) 132 may be determined based on location information from a location device on the delivery assistant computing device. In some examples, the delivery assistant(s) 132 may be notified to meet the courier 124 at a restaurant 120 at or before the pick-up time (e.g., a time courier is scheduled to pick up the order).

At the delivery location 128, the courier 124, the delivery assistant 132, or an order supervisor 116 may drop off the order for delivery. In some examples, for drop-off delivery service, the customer 112 may accept the meal from the courier 124, the delivery assistant 132, or the order supervisor 116, and the delivery may be complete. In some examples, the courier 124, the delivery assistant 132, or the order supervisor 116 may hand off the order to a second order supervisor 116 who may receive the order, provide the order to the customer 112, and subsequently depart the delivery location 128. For full-service catering, in some examples, the courier 124 or the delivery assistant 132 may deliver the order to an order supervisor 116 at the delivery location 128. In such examples, the order supervisor 116 may set-up and serve the meals for the customer 112. The order supervisor 116 may be the same or a different order supervisor 116 instructed to assist in preparation of the order at the restaurant 120. In some examples, the order supervisor 116 may travel to the delivery location 128 in a vehicle with the courier. In such examples, the order supervisor 116 may additionally deliver, in whole or in part, the order to the customer 112.

In some examples, the order may include instructions for the customer 112 to package remaining service items and/or leftovers. In such examples, the customer 112 may package the remaining service items and/or leftovers and leave them in a designated place for courier pick-up. In various examples, the designated place may include a pick-up location specified by the customer 112, such as in the customer profile 110. In some examples, the designated place for courier pick-up may be the same as the location for drop-off. The courier 124 may perform the subsequent pick-up and deliver the remaining service items and/or leftovers to a food service center.

In various examples, the order supervisor 116 assigned to set-up and serve the full-service meal may package the remaining service items and/or leftovers. In some examples, prior to packaging the remaining service items and/or leftovers, the order supervisor 116 may determine an amount of service items remaining and/or leftovers from the meal, such as, for example, by counting the remaining service items and/or weighing the leftovers. In some examples, the order supervisor 116 assigned to package the remaining service items and/or leftovers may be a different order supervisor than the one assigned to set up and serve the full-service meal. The order supervisor 116 may provide the information to the service computing device 102, such as via the service application 134 on a captain computing device. In some examples, the order supervisor 116 may return the remaining service items and/or leftovers to the food service center. In some examples, the order supervisor 116 may leave the packaged remaining service items and/or leftovers in the designated place for courier 124 to pick-up and deliver to the food service center.

In various examples, the courier 124 may be scheduled in advance to perform the subsequent pick-up and delivery to the food service center. In some examples, the courier 124 may be given notice of the subsequent pick-up during at least one of the initial request for delivery services or the delivery message. In some examples, the subsequent pick-up may be scheduled in advance, such as a period of time after delivery (e.g., 2 hours, 2.5 hours, 3 hours, etc.). In some examples, the service computing device 102 may receive an indication of meal completion from the customer 112 or an order supervisor 116 and may contact the courier 124 for the subsequent pick-up. The service computing device 102 may send a message via the courier application, a pop-up message and/or notification, text message, or other means by which the service computing device 102 may contact the courier for the subsequent pick-up.

In various examples, responsive to receiving the remaining service items and/or the leftovers at the food service center, the remaining service items and/or the leftovers may be counted, weighed, or otherwise accounted for. In some examples, the data related to remaining service items and/or leftovers may be provided to the service computing device 102 as feedback from a particular order and/or customer 112.

In various examples, the customer profile(s) 110 may include data learned from previous orders associated with a particular customer, such as customer 112(1). In such examples, the food service may receive feedback from the customer 112(1), an order supervisor 116, a courier 124, and may store the feedback in the customer profile 110 associated with the customer 112(1). For example, the courier 124 may submit updated instructions for delivery at a delivery location 128 associated with the customer 112(1) to the order-processing module 108, such as via a courier application 136. The order-processing module 108 may store the updated instructions for delivery in the customer profile 110 associated with the customer 112(1). For another example, the order supervisor 116 may identify a particular individual associated with the customer who is in charge of instructing the order supervisor on set-up, service, etc. (e.g., office manager). The order supervisor 116 may submit information about the particular individual (e.g., name, contact information, position title, etc.) to the order-processing module 108, such as via the service application 134. The order-processing module 108 may store the information about the particular individual in the customer profile 110 associated with the customer 112(1).

Figure 2:
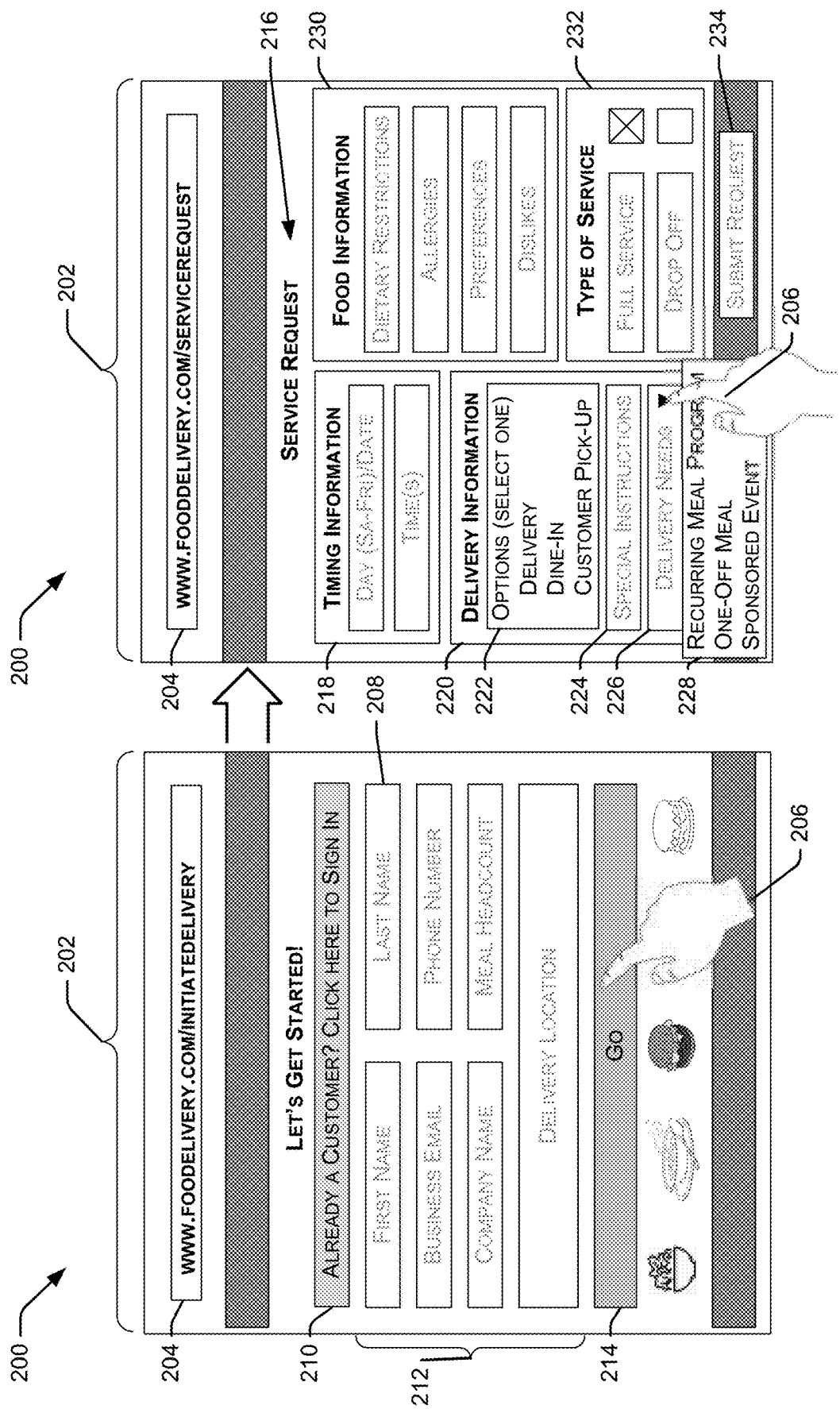
FIG. 2 illustrates an example customer computing device displaying a user interface accessed via a website associated with a food service.

FIG. 2 illustrates an example customer computing device 200 displaying a user interface 202 accessed via a website 204 associated with a food service. In various examples, the user interface 202 may be accessed via an application, such as, for example, a food service application. In various examples, the website 204 and/or the food service application may provide a means by which a customer 206, such as customer 112, may submit a service request (e.g., a food order).

In various examples, the user interface 202 may include one or more sections for data input, such as, for example, section 208 requesting the customer 206 input a last name.

In various examples, the website 204 or food service application may launch a menu for submitting a food service, illustrated as the "Let's Get Started" menu. In various examples, the user interface 202 may include a selectable option 210 to indicate the customer 206 is a returning customer. In such examples, upon selection of the selectable option 210, the user interface 202 may route the customer 206 to a sign-in page (not shown). In various examples, based on a successful sign-in (e.g., verification of identity), the customer may be routed to a customer profile page associated with the website 204 and/or the food service application. In some examples, an identify of the customer may be verified by a service computing device associated with a food service, such as service computing device 102. A returning customer 206 may be able to modify an existing service request, submit a new service request, and/or change information associated with the customer profile via the customer profile page.

In some examples, the menu for submitting a food service may include an initial input 212. In some examples, the initial input 212 may provide a sufficient amount of information to identify the customer 206. In the illustrative example, the initial input 212 includes first name, last name, business email, phone number, company name, meal headcount, and delivery location. In other examples, the initial input 212 may request additional or fewer inputs from the customer 206. In various examples, the customer 206 may submit the initial input 212 to the service computing device by clicking on or otherwise selecting a submit selection 214 (e.g., enter, proceed, etc.), illustrated as a "Go" selection.

Responsive to selecting the submit selection 214, the website 204 and/or the food service application may surface the service request page 216. In various examples, the service request page 216 may include timing information 218 associated with the service request. The timing information 218 may include a day of the week (Saturday-Friday) and/or specified date (month/day/year) and a time associated with the service request. In some examples, the time may include a time window for the requested service. For example, a customer 206 may request a dine-in option, in which the meal is substantially prepared upon arrival (to reduce wait time) at a restaurant. The customer may input a time window, indicating a 1 pm arrival and 2 pm departure. For another example, a customer 206 ordering a drop-off food delivery may be flexible regarding the delivery time. The customer 206 may input a window between 12:30 pm and 1 pm for delivery.

In various examples, the service request page 216 may include delivery information 220 associated with the service request and/or the customer 206. In some examples, the delivery information 220 may include options 222 for selection. In the illustrated examples, the options 222 include delivery, dine-in, and customer pick-up. In other examples, the delivery information 220 may include a greater or lesser number of options 222. In some examples, the options 222 may be determined based on a delivery location or region associated therewith and/or a location associated with the customer 206. For example, a customer located 25 miles out of town may be outside of a delivery region for a food service request. As such, the delivery option may be non-selectable (e.g., greyed out) or not displayed as an option 222.

A selection of the delivery option indicates that the customer 206 requests that the order be delivered to a location associated with the customer 206, such as the delivery location specified in the initial input 212. A selection of the dine-in option indicates that the customer 206 requests that a meal be prepared for the customer to arrive at a restaurant at or substantially close to the time specified in the timing information 218 and consume the order at the restaurant. The dine-in option may reduce an amount of time a customer may have to wait for the order at the restaurant, may enhance service due to an availability of an order supervisor to provide additional services required by the customer 206, and may improve an overall customer restaurant dining experience. A selection of the customer pick-up option indicates that the customer 206 requests for a meal to be prepared at or substantially close to the time specified in the timing information for pick-up by the customer.

In some examples, the delivery information 220 may include special instructions 224 with regard to delivery. The special instructions 224 may include one or more specific requests and/or known challenges regarding delivery. The specific requests may include a person with whom a courier, delivery assistant, and/or order supervisor should deliver the order, one or more specified locations within a delivery location to drop-off and/or set-up the order, instructions to split the order and drop-off and/or set-up in multiple locations, request for a partially cooked order to be delivered for cooking completion on site, instructions and/or materials available for cooking completion on site, or the like. The known challenges regarding delivery may include parking considerations, elevator usage, codes required to access a building, a floor and/or office at the delivery location not specified in an address, or the like.

In various examples, the delivery information 220 may include a delivery needs section 226 may include a drop-down menu of selectable options 228. In some examples, the selectable options 228 may be determined based on services available to the delivery location specified in the initial input 212. In the illustrative example, the selectable options 228 include recurring meal program, one-off meal, and sponsored event. In some examples, the selectable options 228 may include greater or fewer options regarding services rendered. A selection of the recurring meal program indicates that the customer 206 requests the requested service on a recurring basis, on the day of the week and time indicated. A selection of the one-off meal indicates that the customer 206 requests the requested service once at a date and time indicated. A selection of a sponsored event indicates that the customer 206 requires a higher level of service than a standard service request. The higher level of service may be further specified, such as, for example, by submitting a specific request as a special instruction.

In various examples, the service request page 216 may include food information 230 associated with the service request and/or the customer 206. In the illustrative example, the food information 230 includes dietary restrictions, allergies, preferences, and dislikes. In other examples, the food information 230 may include a greater or lesser number of options for input. The dietary restriction section may provide a means by which the customer 206 may indicate religious food restrictions of one or more consumers of the order, and/or that one or more consumers of the order are vegetarians, vegans, pescatarians, or the like. The allergy section may provide a means by which the customer 206 may indicate that one or more consumers of the order has a food allergy, such as, for example, an allergy to peanuts, shellfish, soy, milk, gluten, etc. The preferences section may provide a means by which the customer 206 may indicate a preference for a type of food, type of cuisine, preferred restaurant, or the like. The dislikes section may provide a means by which the customer 206 may indicate a desire to avoid certain types of food, types of cuisines, restaurants, or the like. In various examples, the service computing device may use the food information 230 to identify the restaurant to service the order.

As illustrated in FIG. 2, the service request 216 may include a type of service selection 232 requested. The type of service selection 232 may include full service (e.g., white glove) and drop-off options. The full-service option may include a full catering service, with delivery, set-up, and break-down (e.g., clean up) after the meal. In some examples, the full-service option may include a food preparation completion and/or warm-up of food. In such examples, the order supervisor may complete cooking of a partially cooked meal and/or warm up the appropriate food associated with the order. The drop-off option may include a courier, the delivery assistant, and/or the order supervisor dropping off the order at the delivery location, as specified in the delivery information 220. In some examples, the drop-off option may include a subsequent clean up and/or pick-up of remaining food service items and/or leftovers. In such examples, a same or a different courier, delivery assistant, and/or order supervisor from the delivery drop-off may return to the delivery location, pick-up the remaining food service items and/or leftovers and deliver the remaining food service items and/or leftovers to a food service center.

In some examples, the customer 206 may submit the service request by selecting a submission option 234, illustrated "Submit Request." In some examples, the service request may be automatically submitted responsive to an indication that information has been input into each of the timing information 218, delivery information 220, food information 230, and type of service 232 fields on the service request page 216.

Figure 3:
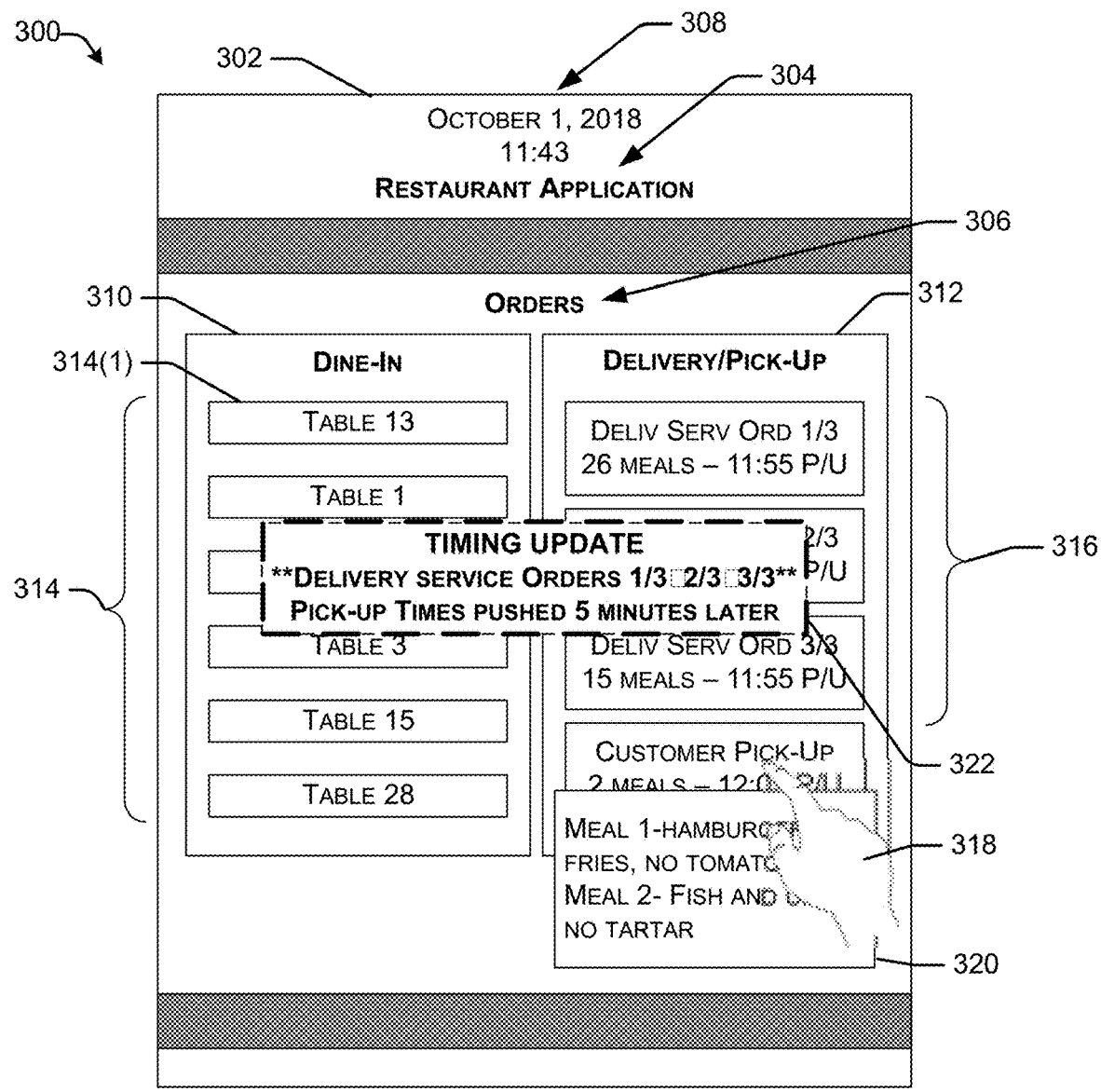
FIG. 3 illustrates an example restaurant computing device displaying a user interface of a restaurant application associated with a restaurant configured to receive one or more batched orders.

FIG. 3 illustrates an example restaurant computing device 300 displaying a user interface 302 of a restaurant application 304 associated with a restaurant configured to receive one or more orders 306. The order(s) 306 may be individual orders (e.g., from a single customer) or batched orders, such as those described above. In various examples, responsive to receiving a service request, such as via the service request page 216 illustrated in FIG. 2, a service computing device, such as service computing device 102, may identify a restaurant to process the service request (e.g., prepare the order) submitted by the customer. In some examples, the restaurant may be identified based on a location associated with the restaurant being within a threshold distance of a delivery location. In some examples, the restaurant may be identified based on timing information, such as timing information 218, delivery information, such as delivery information 220, food information, such as food information 230, and/or a type of service requested, such as type of service 232.

In various examples, responsive to identification of the restaurant, the service computing device may assign the restaurant to the order. In some examples, the service computing device may send a message to the customer requesting approval of the identified restaurant. In such examples, responsive to receiving approval of the restaurant or not receiving a disapproval of the restaurant within a predetermined amount of time, the service computing device may assign the restaurant to the order.

In various examples, the service computing device may generate a food preparation message (e.g., food preparation instruction) including an instruction for the restaurant to prepare food associated with the order. The food preparation message may include a pick-up time associated with the order, such as for customer pick-up or courier pick-up for delivery, food information associated with the order, preparation instructions, degree of cooking of the meals (e.g., fully cooked, partially cooked, etc.), information about an order supervisor assigned to assist in preparation and quality control of the food, serving size (e.g., weight, measurement, caloric count, etc.) per meal headcount (e.g., consumer), temperature of the food, and/or other information relevant to the order and food preparation associated therewith. The service computing device may send the food preparation message to the restaurant computing device 300 via the restaurant application 304, website, or other means by which the service computing device may communicate order information with the restaurant.

In some examples, the service computing device may send the food preparation message to the restaurant at an interval prior to the scheduled pick-up, delivery time, or dine-in time. The interval may be hours, days, and/or weeks prior to the scheduled pick-up and/or scheduled delivery time. In some examples, the service computing device may send the food preparation message to the restaurant at least a day prior to the scheduled pick-up and/or scheduled delivery time, to provide the restaurant with enough time to adequately staff for an expected number of meal preparations. In various examples, the interval may be determined based on a preference stored in a restaurant profile associated with the restaurant. In some examples, the interval may be determined based on a number of orders 306 sent to the restaurant, a number of meals per order 306, and/or a number of orders associated with each batched order. In some examples, the interval may be determined based on a day of the week on which the order is scheduled. For example, a manager of a restaurant may submit a preference to receive batched order(s) to be delivered during a work week (e.g., Monday-Friday) at least three days prior to the delivery date, if the batched order(s) include more than 20 meal headcounts total (e.g., one batched order including 3 orders with 10, 6, and 5 meal headcounts, respectively, two batched orders including 2 orders with 10 and 11 meal headcounts, respectively, and 3 orders with 7, 8, and 9 meal headcounts, respectively, etc.).

In the illustrative example, the restaurant application 304 may be configured to display orders 306 scheduled for a current day 308 (illustrated as Oct. 1, 2018). The orders 306 may include dine-in orders 310 and delivery/pick-up orders 312. The dine-in orders 310 may include orders 306 received from service requests via the food service and/or orders 306 received from patrons of the restaurant. The dine-in orders 310 may include tables 314 associated with the orders. In examples in which the customer requests a dine-in order, the restaurant and/or service computing device may assign the dine-in order to a particular table 314(1). In some examples, the particular table 314(1) may be identified based on one or more special instructions input by the customer, such as special instructions 224 of FIG. 2.

The delivery/pick-up orders 312 may include orders scheduled for pick-up by a courier for delivery to a delivery location or pick-up by the customer. The delivery/pick-up orders 312 may include orders 306 received from service requests via the food service and/or orders 306 received via other means, such as, for example, directly from a customer. In the illustrated example, the delivery/pick-up orders 312 may include whether the order is for delivery or pick-up, an annotation of an order being one of a batched order 316 (illustrated as delivery service order 1/3, 2/3, 3/3), a number of meals associated with each order, and a pick-up time associated with each order (illustrated as P/U). In some examples, the delivery/pick-up orders 312 may include more or less information regarding each order. In some examples, one or more of the dine-in orders and/or delivery/pick-up orders may be selectable and expandable for more information regarding the selected order. In such examples, a user 318 (e.g., employee of the restaurant, order supervisor, etc.) may select an order to view additional order information 320.

In various examples, the service computing device may be configured to update the pick-up time on the day of delivery. In such examples, the service computing device may monitor one or more of the determinative factors (e.g., current traffic, construction, parking, weather, or other factors that may slow a customer on arrival or the courier on a route to a delivery location) for the pick-up time and may update the pick-up time based on a change to one or more determinative factors. In some examples, the service computing device may be configured to send a timing update message 322 to the restaurant computing device 300 on the day of pick-up/delivery. In some examples, the service computing device may cause the timing update message 322 to surface on restaurant computing device, such as via the restaurant application 304. In some examples, the service computing device may cause the timing update message 322 to surface, such as via a pop-up message, text message, messaging application notification, or the like. For example, the service computing device may determine that an injury accident has occurred along a route from the restaurant to the delivery location. The service computing device may determine a re-route is necessary for delivery and may adjust the pick-up time based on the re-route, such as by moving the delivery app order pick-up time 5 minutes to the right (e.g., later). Responsive to determining an adjusted pick-up time, the service computing device may send a timing update message 322 to the restaurant computing device 300, an order supervisor computing device, and/or a courier computing device.

Figure 4:
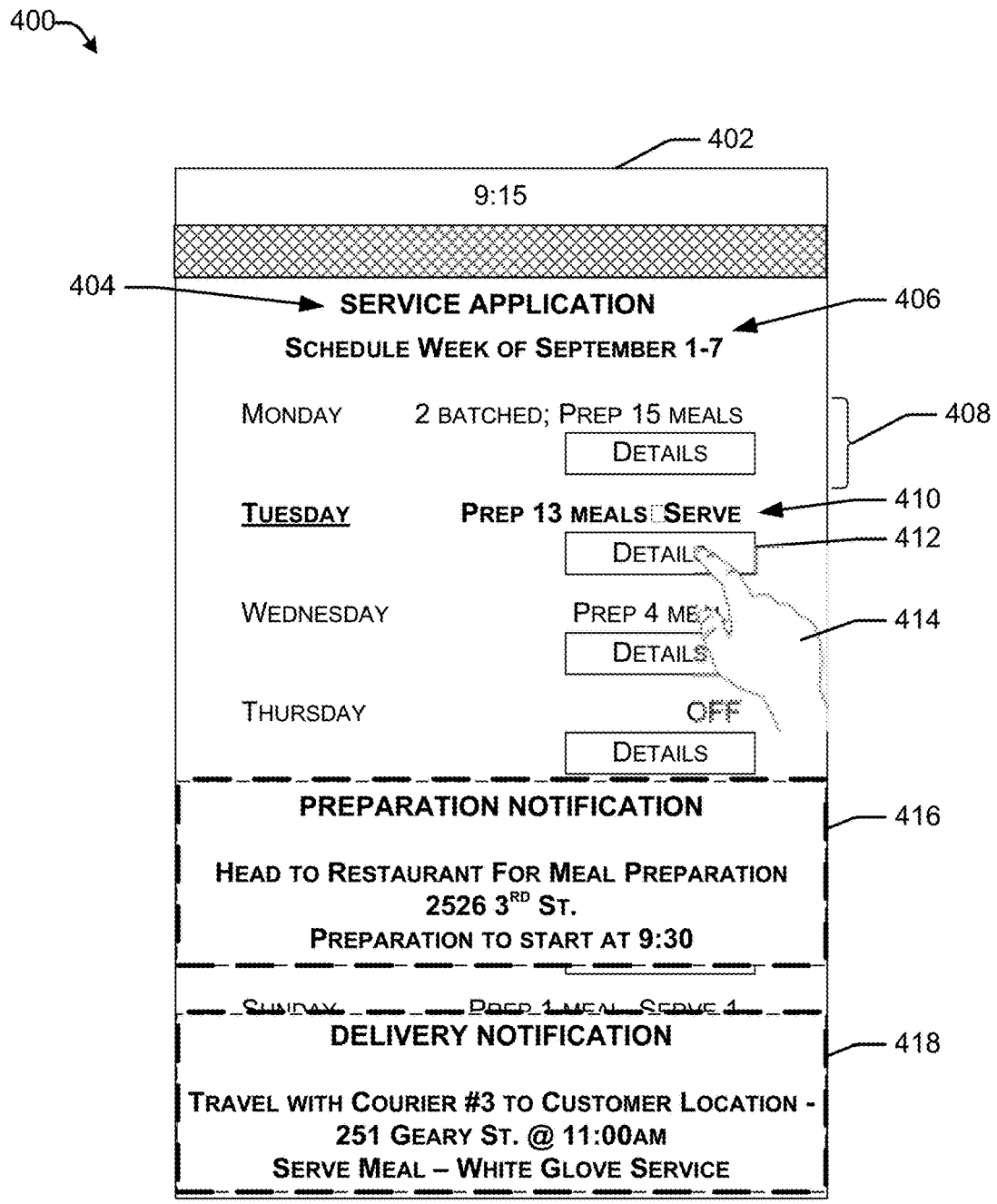
FIG. 4 illustrates an example assistant computing device displaying a user interface of a service application associated with a food service.

FIG. 4 illustrates an example order supervisor computing device (e.g., assistant computing device) 400 displaying a user interface 402 of a service application 404, such as service application 134 associated with a food service. In some examples, an order supervisor may access the information associated with order supervisor duties, such as those illustrated in FIG. 4, via a website associated with the food service or other platform for interaction between a service computing device and the order supervisor. In various examples, responsive to receiving one or more service requests, the service computing device may identify one or more order supervisors, such as order supervisor 116, to service the service request(s).

In some examples, the order supervisor may be identified based on availability on a work schedule. In such examples, the service computing device may access the work schedule on a captain profile, such as captain profile 114, associated with the order supervisor. In some examples, the order supervisor may be identified based on an assigned and/or preferred region (e.g., neighborhood, district, etc.) in which the order supervisor typically operates. In various examples, the service computing device may identify the order supervisor based on one or more preferences associated with the order supervisor. The one or more preferences may include a preference for a restaurant, a preference for preparing a certain type of food, a preference for a type of service (e.g., white glove, drop-off, etc.), order supervisor allergies (e.g., peanut, soy, etc.), and/or other preferences or details stored in the captain profile associated with the order supervisor.

In various examples, the service computing device may identify the order supervisor to multiple service requests, and my build a schedule for a period of time, such as schedule 406. In the illustrative example, the schedule 406 is displayed for a week. In other examples, the schedule 406 may be built for a day, a month, or another period of time. In some examples, the schedule 406 may include options to view daily, weekly, and/or monthly order supervisor schedules.

As illustrated in FIG. 4, the service application 404 may provide a means by which the order supervisor may access information about assigned orders, such as order 408 scheduled on Monday. In some examples, the order 408 may include basic information about the order on a page of the schedule 406, such as a number of meals to prepare for the order 408. In the illustrated example, the order 408 may include a number of batched orders and a number of meals to prepare for the batched orders. In some examples, the order 408 may include a total number of meals, a number of meals per batched order, whether the order supervisor is scheduled to serve an order, such as shown as serve instruction 410.

In various examples, the user interface 402 of the service application 404 (food service website, or other interaction platform) may include a detail selection option 412. The detail selection option 412 may provide a means by which a user 414 (e.g., the order supervisor) may access additional details about the scheduled order. The additional details may include customer data, food data, type of service requested, order supervisor responsibilities regarding food preparation (e.g., cooking food, menu, packaging orders, weighing serving sizes, verifying weights meet a pre-defined weight criteria, taking temperature of food, verifying temperatures meet a pre-defined temperature criteria, ensuring a level of cooking (e.g., partially cooked meal, fully cooked meal, etc.), responsibilities regarding a type of service requested, restaurant data (e.g., name, address, point of contact), expected serving sizes, customer pick-up data (e.g., time, location, etc.), customer dine-in data (e.g., number of consumers, time associated with dining experience, seating requests, etc.), delivery information (e.g., pick-up time, courier data, delivery assistant data, delivery location, whether an order supervisor rides with courier to delivery location, etc.), order clean-up information (e.g., packaging duties, instructions, return of remaining service items and/or leftovers to food service center), and/or any other information which may be pertinent to the preparation, delivery, service, and/or clean-up of an order. For example, the user 414 may select the detail selection option 412 and may determine that on Tuesday, the order supervisor will prepare thirteen meals of spaghetti Bolognese with meatballs, garlic bread, and Caesar salad for a customer. The order supervisor is scheduled to ensure the meals are fully cooked, packaged and ready for pick-up by 11:00 am, at which time a courier will arrive to transport the order and the order supervisor to a delivery location at 251 Geary St. The order supervisor may determine that they will serve the meal, package the remaining service items while leaving leftovers with the customer, and deliver the remaining service items to the food service center via public transportation.

In various examples, the service computing device may be configured to send a preparation notification 416 (e.g., assistance message, assistance notification) to the order supervisor (e.g., assistant) at a first interval prior to a scheduled pick-up time at the restaurant, an estimated time associated with a start of food preparation at the restaurant, or the like. In some examples, the service computing device may be configured to cause the preparation notification 416 to surface on the captain computing device 400, such as via a pop-up message, text message, messaging application notification, or the like. The first interval may be an hour, two hours, 30 minutes, 45 minutes, etc., prior to the pick-up time at the restaurant, the estimated time associated with a start of food preparation at the restaurant, or the like. The first interval may be determined by the service computing device based on a distance between the order supervisor and restaurant. In such examples, the service computing device may receive location data from the order supervisor computing device 400 and may calculate the distance between the order supervisor and the restaurant. In some examples, the first interval may be determined based on known or current traffic considerations, parking considerations, weather considerations, a type of transit used by the order supervisor (e.g., personally operated vehicle, public transportation, private transportation, etc.), or the like.

In the illustrated example, the preparation notification 416 includes an instruction for the order supervisor to travel to the restaurant to assist in preparation of one or more batched orders. In some examples, the preparation notification 416 may include an instruction for the order supervisor to perform quality control measures on the batched order(s). The quality control measures may include measuring serving sizes, verifying proper packaging, verifying a number of meals per order, ensuring allergy and/or dietary restriction considerations have been met, and/or other measures to ensure high quality standards are met. In some examples, the preparation notification 416 may include an instruction to verify partial cooking of an order (e.g., not fully cooked order) for delivery or customer pick-up. In such examples, an order supervisor, courier, delivery assistant, or customer may complete the cooking at the delivery location and/or other location associated with the customer. In some examples, a partially cooked order may be packaged for delivery by a courier or pick-up by a customer. In some examples, the partially cooked order maybe packaged as a meal kit and may include instructions on cooking completion, implements required for preparation and/or consumption (e.g., plasticware, silverware, serviettes, etc.), or the like. In some examples, the order supervisor assisting in order preparation may ensure the instructions on cooking completion are included with the order.

In various examples, the preparation notification 416 may inform the order supervisor that the customer will pick-up the order at the restaurant or that the customer is requesting a dine-in option. The dine-in option may include the customer traveling to the restaurant to eat a meal on site. In some examples, the preparation notification 416 may include information about a number of people accompanying the customer (e.g., number of consumers), order details, a serving time(s) (e.g., customer's requested time to dine) for each course to be served, seating requests, or the like. In such examples, the order supervisor may assist in preparing the order and may ensure the customer's requests are satisfied. In various examples, with a dine in option, the order supervisor may assist restaurant personnel with seating the customer, serving the customer, cooking food for the customer, and/or handling special requests of the customer. In such examples, the order supervisor may receive special instructions associated with the dine in experience via the detail selection option 412, the preparation notification 416, or a dine-in notification (not illustrated).

In various examples, the service computing device may be configured to send a delivery notification 418 to the order supervisor. In some examples, the service computing device may be configured to cause the preparation message to surface on the captain computing device 400, such as via a pop-up message, text message, messaging application notification, or the like. In the illustrative example, the delivery notification 418 includes a delivery location, delivery time, type of service requested (illustrated as white glove service), and a means of transportation (e.g., travel with courier). In other examples, the delivery notification 418 may include more or less information about the delivery, such as special instructions about delivery, parking considerations, a point of contact at the delivery location, or the like.

Figure 5:
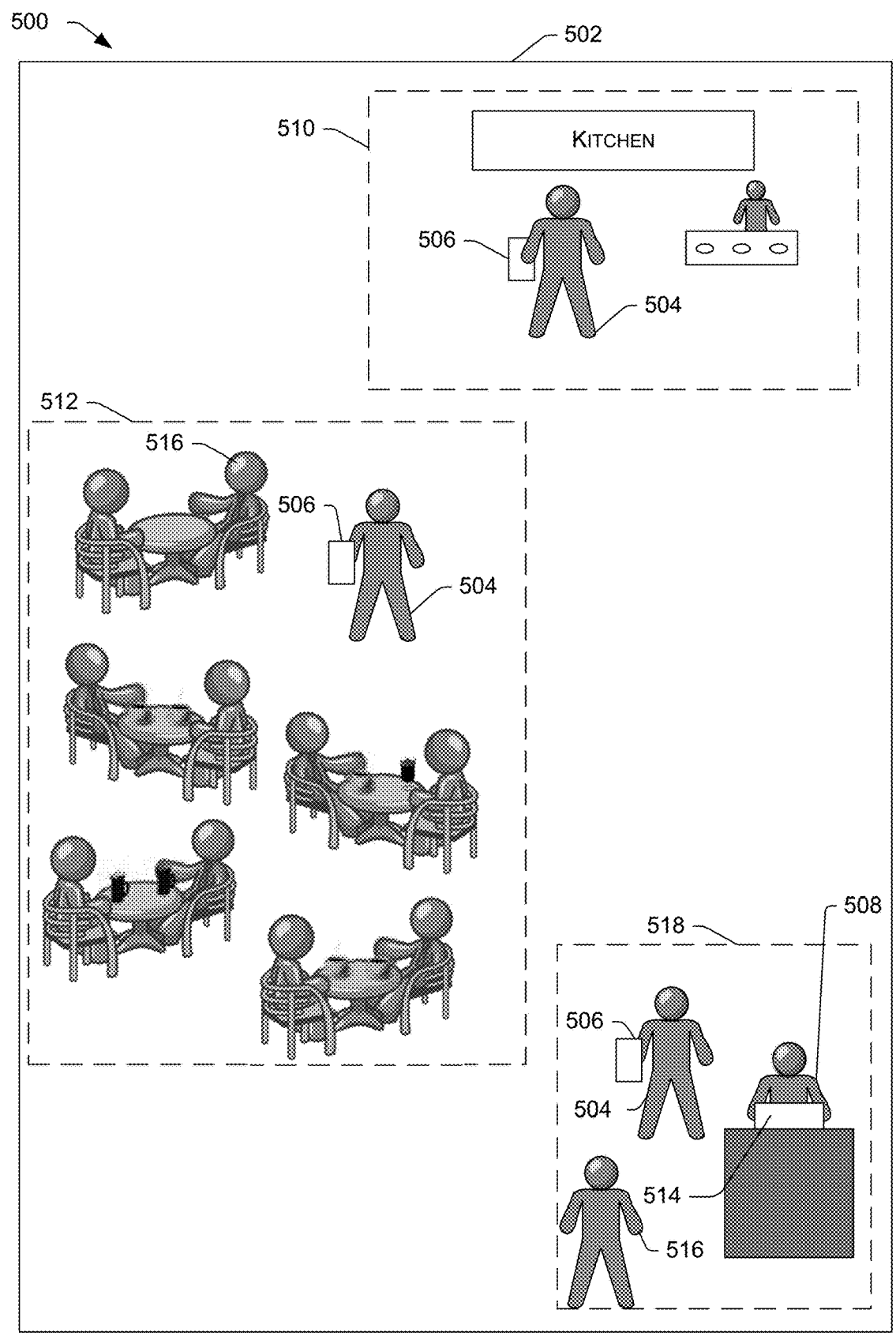
FIG. 5 illustrates an example environment of a restaurant in which an assistant is dispatched to perform services associated with service requests.

FIG. 5 illustrates an example environment 500 of a restaurant 502, such as restaurant 120, in which an order supervisor 504 (e.g., assistant), such as order supervisor 116, is dispatched to perform services associated with service requests. In various examples, the order supervisor 504 may be assigned to perform order supervisor duties at the restaurant on a schedule, such as schedule 406. In some examples, the order supervisor 504 may receive a preparation notification, such as preparation notification 416 on an order supervisor computing device 506, such as order supervisor computing device 400. In various examples, the order supervisor 504 may access information regarding orders on the order supervisor computing device 506, such as via a service application, such as service application 404, a website, or other platform for accessing service request information.

In various examples, the order supervisor 504 may receive an instruction to travel to the restaurant 502. In some examples, the order supervisor 504 may receive an instruction to check-in with a restaurant employee 508. In such examples, the restaurant employee 508 may inform the order supervisor 504 on details specific to the restaurant, such as a location of the kitchen 510, dining area(s) 512, restrooms, or the like. In some examples, the restaurant employee 508 may send the service computing device a check-in message via restaurant computing device 514, informing the service computing device that the order supervisor 504 arrived. In some examples, the order supervisor 504 may send the check-in message via the order supervisor computing device 506. In some examples, the service computing device may access location data associated with the order supervisor computing device 506, and may determine, based on the location data, that the order supervisor 504 has arrived at the restaurant.

In various examples, a service request received from a customer 516 may include a selection for a dine-in option. The dine-in option may include the customer 516 traveling to the restaurant 502 to eat a meal on site. In some examples, the service request may include information regarding the requested dine-in service, such as information about a number of people accompanying the customer 516 (e.g., number of consumers), order details, a serving time(s) (e.g., customer's requested time to dine) for each course to be served, seating requests, or the like.

In examples in which the dine-in option is requested, the order supervisor 504 act as a maître d'. The order supervisor 504 may assist in preparing the order in the kitchen 510, greet the customer 516 in a foyer 518, host stand, or other area associated with the restaurant 502, seat the customer in the dining area 512, assist in serving the customer 516, assist in post-meal clean-up, and/or ensure that all customer 516 requests are satisfied. In various examples, the order supervisor 504 may be instructed to ensure a partial cooking of the order prior to customer 516 arrival at the restaurant 502. In such examples, once the customer 516 is greeted and seated, the order supervisor 504 may ensure the meal preparation is properly completed.

In some examples, the service request may include a seating preference. The seating preference may include a window seat, a particular table, a booth, a secluded spot, a private room, or the like. In such examples, the order supervisor 504 or restaurant employee 508 may seat the customer 516 at a table based on the seating preference, such as at table #1.

In various examples, the service request received from the customer may include a selection for a customer pick-up option. The customer pick-up option may include the customer 516 traveling to the restaurant 502 to pick up the order associated with the service request. In various examples, the order supervisor 504 may assist in preparing the order (e.g., cooking, packaging, etc.), such as in the kitchen 510. The order supervisor 504 may ensure that all special instructions in the service request are satisfied. For example, if the customer 516 requests a partially cooked order, the order supervisor may ensure a partial cooking of the order. The customer may then complete cooking at home, such as based on instructions included in the packaged order (e.g., meal kit).

In some examples, the order supervisor 504 may provide the order to the customer 516 at a pick-up location, such as in the foyer 518 or other designated area in the restaurant. In some examples, the order supervisor 504 may leave the customer pick-up order with the restaurant employee 508 at the pick-up location for customer pick-up. In various examples, the service computing device may send a notification to a customer computing device informing the customer 516 that the order is ready for pick-up. In some examples, the notification may include the pick-up location, such as, for example, at a host stand in the foyer 518.

In various examples, the service request received from the customer may include a selection for delivery to a delivery location, such as delivery location 128. In such examples, the order supervisor 504 may assist in preparing the order, ensuring quality control of the order and that customer requests are satisfied, and may provide the order to a courier at the pick-up location (illustrated as foyer 518). The courier may arrive at the restaurant 502, pick up the order, and deliver it to the delivery location. As described in further detail above, in some examples, the order supervisor 504 may be instructed to travel to the delivery location with the courier, to deliver the order. In some examples, the order supervisor 504 may deliver the order to the delivery location and drop it off with the customer. In some examples, the order supervisor 504 may deliver the order to the delivery location, prepare the order for consumption, serve the order, and/or clean up remaining service items and/or leftover food.

Figure 6:
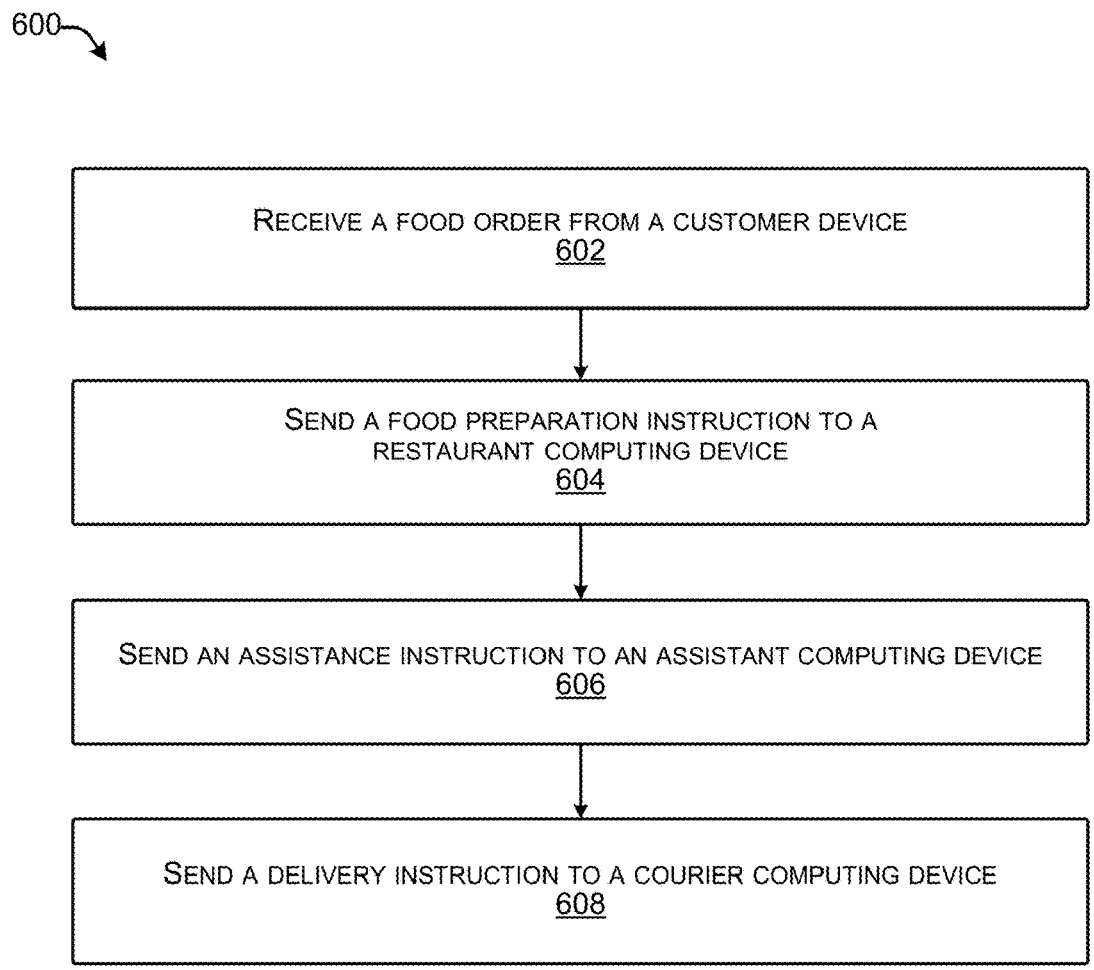
FIG. 6 illustrates an example process for receiving and processing a delivery service request from a customer.
Figure 7:
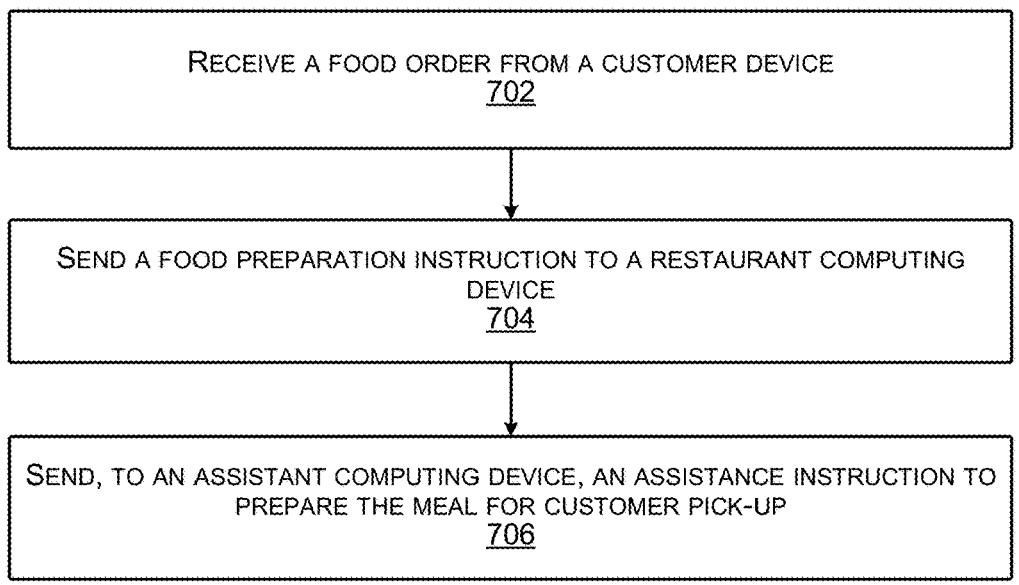
FIG. 7 illustrates an example process for receiving and processing a pick-up service request from a customer.
Figure 8:
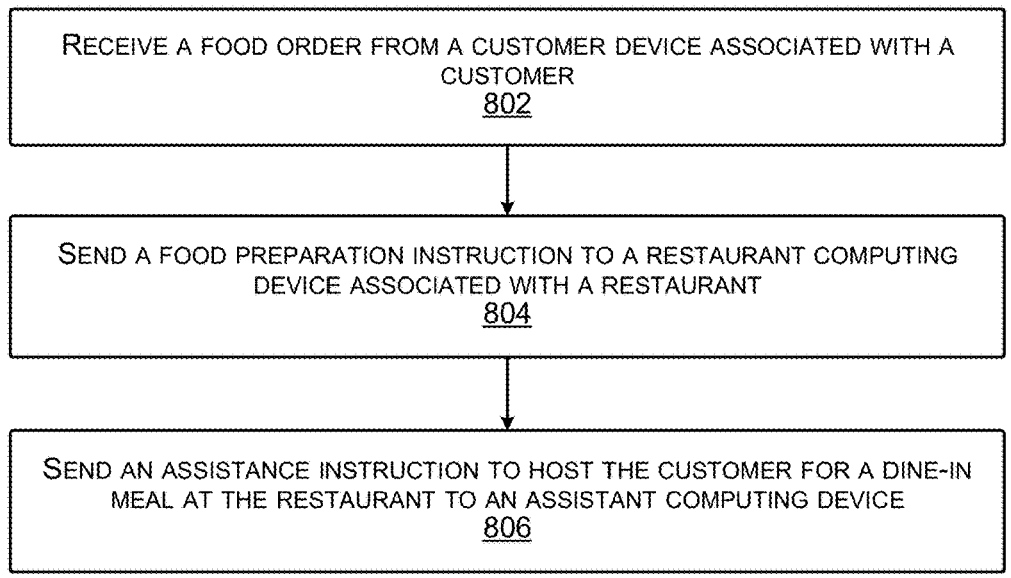
FIG. 8 illustrates an example process for receiving and processing a dine-in service request from a customer.

FIGS. 6-8 are flow diagrams illustrating example processes according to some implementations. The processes of FIGS. 5-8 are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 6-8 can be combined with some or all of the operations illustrated in others of FIGS. 6-8. For discussion purposes, the processes are described with reference to the environments, architectures and devices described in the examples herein, although the processes may be implemented in a wide variety of other environments, architectures and devices.

Various instructions, methods and techniques described herein may be considered in the general context of computer-executable instructions, such as program modules stored on computer-readable media and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

FIG. 6 illustrates an example process 600 for receiving and processing a food order (e.g., service request) from a customer. FIG. 6 is described in the context of the environments and device(s) described above with reference to FIGS. 1-5, but is not limited to such environments and device(s).

Block 602 illustrates receiving the food order from a customer computing device, such as customer computing device 200, associated with a customer, such as customer 112 and 206. In various examples, the food order may include a request for food delivery (e.g., food service request), food delivery and service, meal preparation for customer pick-up, and/or meal preparation and service at a restaurant. In some examples, the food order may include customer data (e.g., delivery location, meal headcount (i.e., a number of people to be fed), contact information, etc.), food data (e.g., preferences, allergies (e.g., peanut, shellfish, soy, milk, gluten, etc.), dietary restrictions (e.g., religious, vegan, vegetarian, etc.), etc.), delivery data (e.g., day(s), time, special instructions for delivery, etc.), and/or a type of service (e.g., full service (i.e., white glove catering-type service), drop-off service, etc.).

In some examples, two or more food orders may be batched if they are scheduled on a same day and include requested delivery times within a threshold time (e.g., within 10 minutes, 15 minutes, etc.) of one another. In various examples, a first food order may be batched with a second food order if they are within a threshold distance (e.g., 5 city blocks, ½ mile, 1 mile, 5 miles, etc.) from one another. In some examples, a second food order may be batched with the first food order if a second delivery location is within the threshold distance, from a first delivery location.

The service computing device may assign a restaurant to the food order submitted by customer. In various examples, the restaurant may be assigned based on a location associated with the restaurant being within a threshold distance from a location associated with the customer (e.g., delivery location). In some examples, the restaurant may be assigned based on customer data and/or food data associated with the customer. For example, the customer may include a food preference for ethnic food, and the service computing device may assign the restaurant serving Chinese cuisine, to the food order.

Block 604 illustrates sending a food preparation instruction (e.g., food preparation message, food preparation notification) to a restaurant computing device, such as restaurant computing device 300, associated with a restaurant, such as restaurant 120. In some examples, the food preparation instruction may include an instruction for the restaurant to prepare the food order for pick-up at a pick-up time on the delivery day/date. In various examples, the service computing device may be configured to determine the pick-up time based on a delivery time requested by the customer. The pick-up time may be determined based on a distance from a location associated with the restaurant to a delivery location associated with the food order, known traffic patterns, known parking considerations, weather considerations, a scheduled delivery assistant and/or an order supervisor to accompany courier, or the like. In some examples, two or more orders may be batched for delivery. In such examples, the pick-up time may be based on a distance to a first delivery location.

In some examples, the service computing device may send the food order to the restaurant at an interval prior to the scheduled pick-up and/or scheduled delivery time. The interval may be hours, days, and/or weeks prior to the scheduled pick-up and/or scheduled delivery time. In some examples, the service computing device may send the food order to the restaurant at least a day prior to the scheduled pick-up and/or scheduled delivery time, to provide the restaurant with enough time to adequately staff for an expected number of meal preparations. In various examples, the interval may be determined based on a preference stored in a restaurant profile associated with the restaurant. In some examples, the interval may be determined based on a number of food orders batched together and sent to the restaurant and/or a number of orders associated with each batched order. In some examples, the interval may be determined based on a day of the week on which the order is scheduled.

In some examples, such as if the food order is sent in advance of the delivery day, the service computing device may be configured to send a reminder message to the restaurant computing device associated with the restaurant on the day of pick-up/delivery. In some examples, the service computing device may cause the reminder message to surface on restaurant computing device, such as via the restaurant application. In some examples, the service computing device may cause the reminder message to surface, such as via a pop-up message, text message, messaging application notification, or the like.

Block 606 illustrates sending an assistance instruction to an order supervisor (e.g., assistant) computing device, such as order supervisor computing device 400. In some examples, the order supervisor may be identified based on availability on a work schedule. In such examples, the service computing device may access the work schedule on a captain profile associated with the order supervisor. In some examples, the service computing device may build a work schedule for the order supervisor based on assigned food orders. In some examples, the order supervisor may be identified based on an assigned and/or preferred region (e.g., neighborhood, district, etc.) in which the order supervisor operates. In various examples, the service computing device may identify the order supervisor based on one or more preferences associated with the order supervisor. The one or more preferences may include a preference for a restaurant, a preference for preparing a certain type of food, a preference for a type of service (e.g., white glove, drop-off, etc.), order supervisor allergies (e.g., peanut, soy, etc.), and/or other preferences or details stored in a captain profile associated with the order supervisor.

In various examples, the service computing device may be configured to send an assistance instruction (e.g., preparation message, preparation notification) to the order supervisor at a first interval prior to the pick-up time at the restaurant, an estimated time associated with a start of food preparation at the restaurant, or the like. The assistance instruction may include an instruction for the order supervisor to travel to the restaurant to assist in preparation the food order, perform quality control measures, or the like. The quality control measures may include measuring serving sizes, verifying proper packaging, verifying a number of meals per order, ensuring allergy and/or dietary restriction considerations have been met, and/or other measures to ensure high quality standards are met. In some examples, the preparation message may include an instruction to verify partial cooking of an order (e.g., not fully cooked order) for delivery or customer pick-up. In such examples, an order supervisor, courier, delivery assistant, or customer may complete the cooking at the delivery location and/or other location associated with the customer. In some examples, a partially cooked order may be packaged for delivery by a courier or pick-up by a customer. In some examples, the partially cooked order maybe packaged as a meal kit and may include instructions on cooking completion, implements required for preparation and/or consumption (e.g., plasticware, silverware, serviettes, etc.), or the like. In some examples, the order supervisor assisting in order preparation may ensure the instructions on cooking completion are included with the order.

In various examples, the assistance instruction may inform the order supervisor that the customer will pick-up the order at the restaurant or that the customer is requesting a dine-in option. The dine-in option may include the customer traveling to the restaurant to eat a meal on site. In some examples, the preparation message may include information about a number of people accompanying the customer (e.g., number of consumers, number of people to be fed), order details, a serving time(s) (e.g., customer's requested time to dine) for each course to be served, seating requests, or the like. In such examples, the order supervisor may assist in preparing the order and may ensure the customer's requests are satisfied.

In some examples, the service computing device may be configured to cause the assistance instruction to surface on the captain computing device, such as via a pop-up message, text message, messaging application notification, or the like. The first interval may be an hour, two hours, 30 minutes, 45 minutes, etc., prior to the pick-up time at the restaurant, the estimated time associated with a start of food preparation at the restaurant, or the like. The first interval may be determined by the service computing device based on a distance between the order supervisor and restaurant. In such examples, the service computing device may receive location data from the assistant computing device (e.g., order supervisor computing device) and may calculate the distance between the order supervisor and the restaurant. In some examples, the first interval may be determined based on known or current traffic considerations, parking considerations, weather considerations, a type of transit used by the order supervisor (e.g., personally operated vehicle, public transportation, private transportation, etc.), or the like.

Block 608 illustrates sending a delivery instruction to a courier computing device associated with a courier. In some examples, the delivery instruction may be sent via a courier application, such as courier application 136. In some examples, the delivery instruction may be sent via text message, social media or other application message, phone call, or other means of transmitting a message and/or notification.

In various examples, the service computing device may identify the couriers to deliver the one or more orders in a batched order. In such examples, more than one courier may be identified based on proximity of delivery locations (e.g., locations associated with the customers), proximity of time for order delivery, a size of an order, delivery instructions, traffic and/or parking considerations, weather considerations, scheduled delivery assistant and/or order supervisor to accompany the courier, or the like.

In various examples, the service computing device may first send a request for delivery services to the courier for the food order. In various examples, the service computing device may send the request for delivery services via the courier application. In some examples, the service computing device may send the request for delivery services via a website or other means by which the service computing device may communicate with a courier computing device (e.g., electronic mail, text message, messaging application, telephone call, etc.). In some examples, the request for delivery services may be sent hours, days, and/or weeks before the day and/or time associated with delivery of the one or more orders of the batched order. In such examples, the courier may be able to schedule the delivery in advance. In some examples, the request for delivery services may include a means by which the courier may accept or deny respective deliveries. For example, the service computing device may cause the request to automatically surface on a display of the courier computing device, such as via the courier application, a messaging application, or the like. The request may include details regarding the delivery (e.g., date, pick-up time, delivery time, restaurant location, delivery location, etc.) and a selectable option to accept or deny the delivery. Responsive to receiving a selection to accept or deny the delivery, the service computing device may schedule the courier, or identify a different courier to deliver the order.

Additionally, the service computing device may identify one or more delivery assistants to assist the courier in order delivery. The delivery assistant(s) may be identified based on delivery instructions, high density traffic areas, timing associated with deliveries of multiple orders, or the like. For example, a delivery location may provide no legal opportunity for parking within a reasonable distance (e.g., one block, 3 blocks, 5 blocks, etc.). As such, the service computing device may determine that the courier may need a delivery assistant to provide the order to the customer (e.g., perform the physical delivery) while the courier remains with a vehicle associated therewith. For another example, the service computing device 102 may determine that the delivery times associated with a first order and a second order in a batched order, are not spaced apart sufficiently based on traffic and parking considerations for the courier to deliver the first order at a first delivery location, travel to the second delivery location, and deliver the second order at the second delivery location. Based on the determination that the delivery times are too close together, the service computing device may identify a first delivery assistant(s) to deliver the first order and a second delivery assistant to deliver the second order.

In some examples, the delivery assistant(s) may be identified based on availability (e.g., a schedule of availability). In some examples, the delivery assistant(s) may be identified based on a location associated with the delivery assistant(s). The location may be determined based on a location device of a computing device associated with the delivery assistant (e.g., delivery assistant computing device).

In various examples, the service computing device may send a request for services to the delivery assistant computing device. Similar to the request for courier services described above, the service computing device may send the request via an application, text message, phone call, or other means by which the service computing device may request services. The request may include a means by which the delivery assistant(s) may accept or deny the request. In some examples, the service computing device may cause the request, along with a selectable option to accept or deny the request, to surface on a display of a delivery assistant computing device.

In various examples, responsive to receiving an acceptance of the request for services or not receiving a denial of the request for services within a threshold period of time, the service computing device may send a delivery assistant instruction to a delivery assistant computing device. In some examples, the delivery assistant instruction may include a location in which the courier will pick up the delivery assistant. In some examples, the delivery assistant instruction may include an instruction to travel to the restaurant by the pick-up time associated with the food order, meet the courier at the restaurant, and travel with the courier. In various examples, the delivery assistant instruction may include details regarding the assigned deliveries, such as, for example, delivery instructions, addresses, a point of contact for delivery, a delivery time, and/or other information associated with the delivery.

FIG. 7 illustrates an example process 700 for receiving and processing a pick-up service request from a customer. FIG. 7 is described in the context of the environments and device(s) described above with reference to FIGS. 1-5, but is not limited to such environments and device(s).

Block 702 illustrates receiving the food order from a customer computing device, such as customer computing device 200, associated with a customer, such as customer 112 and 206. In various examples, the food order may include a request for food delivery (e.g., food service request), food delivery and service, meal preparation for customer pick-up, and/or meal preparation and service at a restaurant. In some examples, the food order may include customer data (e.g., delivery location, meal headcount (i.e., a number of people to be fed), contact information, etc.), food data (e.g., preferences, allergies (e.g., peanut, shellfish, soy, milk, gluten, etc.), dietary restrictions (e.g., religious, vegan, vegetarian, etc.), etc.), delivery data (e.g., day(s), time, special instructions for delivery, etc.), and/or a type of service (e.g., full service (i.e., white glove catering-type service), drop-off service, etc.).

In some examples, two or more food orders may be batched if they are scheduled on a same day and include requested delivery times within a threshold time (e.g., within 10 minutes, 15 minutes, etc.) of one another. In various examples, a first food order may be batched with a second food order if they are within a threshold distance (e.g., 5 city blocks, ½ mile, 1 mile, 5 miles, etc.) from one another. In some examples, a second food order may be batched with the first food order if a second delivery location is within the threshold distance, from a first delivery location.

The service computing device may assign a restaurant to the food order submitted by customer. In various examples, the restaurant may be assigned based on a location associated with the restaurant being within a threshold distance from a location associated with the customer (e.g., delivery location). In some examples, the restaurant may be assigned based on customer data and/or food data associated with the customer. For example, the customer may include a food preference for ethnic food, and the service computing device may assign the restaurant serving Chinese cuisine, to the food order.

Block 704 illustrates sending a food preparation instruction (e.g., food preparation message, food preparation notification) to a restaurant computing device, such as restaurant computing device 300, associated with a restaurant, such as restaurant 120. In some examples, the food preparation instruction may include an instruction for the restaurant to prepare the food order for pick-up at a pick-up time on the delivery day/date. In various examples, the service computing device may be configured to determine the pick-up time based on a delivery time requested by the customer. The pick-up time may be determined based on a distance from a location associated with the restaurant to a delivery location associated with the food order, known traffic patterns, known parking considerations, weather considerations, a scheduled delivery assistant and/or an order supervisor to accompany courier, or the like. In some examples, two or more orders may be batched for delivery. In such examples, the pick-up time may be based on a distance to a first delivery location.

In some examples, the service computing device may send the food order to the restaurant at an interval prior to the scheduled pick-up and/or scheduled delivery time. The interval may be hours, days, and/or weeks prior to the scheduled pick-up and/or scheduled delivery time. In some examples, the service computing device may send the food order to the restaurant at least a day prior to the scheduled pick-up and/or scheduled delivery time, to provide the restaurant with enough time to adequately staff for an expected number of meal preparations. In various examples, the interval may be determined based on a preference stored in a restaurant profile associated with the restaurant. In some examples, the interval may be determined based on a number of food orders batched together and sent to the restaurant and/or a number of orders associated with each batched order. In some examples, the interval may be determined based on a day of the week on which the order is scheduled.

In some examples, such as if the food order is sent in advance of the delivery day, the service computing device may be configured to send a reminder message to the restaurant computing device associated with the restaurant on the day of pick-up/delivery. In some examples, the service computing device may cause the reminder message to surface on restaurant computing device, such as via the restaurant application. In some examples, the service computing device may cause the reminder message to surface, such as via a pop-up message, text message, messaging application notification, or the like.

Block 706 illustrates sending, to an assistant computing device, an assistance instruction to prepare the order for the customer to pick-up. The customer pick-up option may include the customer traveling to the restaurant to pick up the order associated with the food order. In various examples, the order supervisor may assist in preparing the order (e.g., cooking, packaging, etc.) and may ensure that all special instructions in the food order are satisfied. For example, if the customer requests a partially cooked order, the order supervisor may ensure a partial cooking of the order. The customer may then complete cooking at home, such as based on instructions included in the packaged order.

In some examples, the order supervisor may provide the order to the customer at a pick-up location within the restaurant. In some examples, the order supervisor may leave the customer pick-up order with a restaurant employee at the pick-up location for customer pick-up. In various examples, the service computing device may send a notification to a customer computing device informing the customer that the order is ready for pick-up. In some examples, the order supervisor may send the notification to the customer from the order supervisor computing device, such as via the service application. In some examples, the order supervisor may send a message to the service computing device informing the service computing device that the order is ready for pick up. In such examples, the service computing device may then send the notification to the customer. The notification may include the pick-up location.

FIG. 8 illustrates an example process 800 for receiving and processing a dine-in service request from a customer. FIG. 8 is described in the context of the environments and device(s) described above with reference to FIGS. 1-5, but is not limited to such environments and device(s).

Block 802 illustrates receiving the food order from a customer computing device, such as customer computing device 200, associated with a customer, such as customer 112 and 206. In various examples, the food order may include a request for food delivery (e.g., food service request), food delivery and service, meal preparation for customer pick-up, and/or meal preparation and service at a restaurant. In some examples, the food order may include customer data (e.g., delivery location, meal headcount (i.e., a number of people to be fed), contact information, etc.), food data (e.g., preferences, allergies (e.g., peanut, shellfish, soy, milk, gluten, etc.), dietary restrictions (e.g., religious, vegan, vegetarian, etc.), etc.), delivery data (e.g., day(s), time, special instructions for delivery, etc.), and/or a type of service (e.g., full service (i.e., white glove catering-type service), drop-off service, etc.).

In some examples, two or more food orders may be batched if they are scheduled on a same day and include requested delivery times within a threshold time (e.g., within 10 minutes, 15 minutes, etc.) of one another. In various examples, a first food order may be batched with a second food order if they are within a threshold distance (e.g., 5 city blocks, ½ mile, 1 mile, 5 miles, etc.) from one another. In some examples, a second food order may be batched with the first food order if a second delivery location is within the threshold distance, from a first delivery location.

The service computing device may assign a restaurant to the food order submitted by customer. In various examples, the restaurant may be assigned based on a location associated with the restaurant being within a threshold distance from a location associated with the customer (e.g., delivery location). In some examples, the restaurant may be assigned based on customer data and/or food data associated with the customer. For example, the customer may include a food preference for ethnic food, and the service computing device may assign the restaurant serving Chinese cuisine, to the food order.

Block 804 illustrates sending a food preparation instruction (e.g., food preparation message, food preparation notification) to a restaurant computing device, such as restaurant computing device 300, associated with a restaurant, such as restaurant 120. In some examples, the food preparation instruction may include an instruction for the restaurant to prepare the food order for pick-up at a pick-up time on the delivery day/date. In various examples, the service computing device may be configured to determine the pick-up time based on a delivery time requested by the customer. The pick-up time may be determined based on a distance from a location associated with the restaurant to a delivery location associated with the food order, known traffic patterns, known parking considerations, weather considerations, a scheduled delivery assistant and/or an order supervisor to accompany courier, or the like. In some examples, two or more orders may be batched for delivery. In such examples, the pick-up time may be based on a distance to a first delivery location.

In some examples, the service computing device may send the food order to the restaurant at an interval prior to the scheduled pick-up and/or scheduled delivery time. The interval may be hours, days, and/or weeks prior to the scheduled pick-up and/or scheduled delivery time. In some examples, the service computing device may send the food order to the restaurant at least a day prior to the scheduled pick-up and/or scheduled delivery time, to provide the restaurant with enough time to adequately staff for an expected number of meal preparations. In various examples, the interval may be determined based on a preference stored in a restaurant profile associated with the restaurant. In some examples, the interval may be determined based on a number of food orders batched together and sent to the restaurant and/or a number of orders associated with each batched order. In some examples, the interval may be determined based on a day of the week on which the order is scheduled.

In some examples, such as if the food order is sent in advance of the delivery day, the service computing device may be configured to send a reminder message to the restaurant computing device associated with the restaurant on the day of pick-up/delivery. In some examples, the service computing device may cause the reminder message to surface on restaurant computing device, such as via the restaurant application. In some examples, the service computing device may cause the reminder message to surface, such as via a pop-up message, text message, messaging application notification, or the like.

Block 806 illustrates sending, to an assistant computing device, an assistance instruction to host the customer for a dine-in meal at the restaurant. The dine-in option may include the customer traveling to the restaurant to consumer the food order on site. In some examples, the food order may include information regarding the requested dine-in service, such as information about a number of people accompanying the customer (e.g., number of consumers, number of people to be fed), order details, a serving time(s) (e.g., customer's requested time to dine) for each course to be served, seating requests, or the like.

The assistance instruction may include an instruction for the order supervisor to assist in preparing the order in the kitchen, greet the customer in a hosting area (e.g., host stand, or other area associated with the restaurant), seat the customer in the dining area, assist in serving the customer, assist in post-meal clean-up, and/or ensure that all customer requests are satisfied. In various examples, the assistance instruction may include an instruction to ensure a partial cooking of the order prior to customer arrival at the restaurant. In such examples, once the customer is greeted and seated, the order supervisor may ensure the meal preparation is properly completed. In some examples, the food order may include a seating preference. The seating preference may include a window seat, a particular table, a booth, a secluded spot, a private room, or the like. In such examples, the order supervisor or a restaurant employee may seat the customer at a table based on the seating preference.

Figure 9:
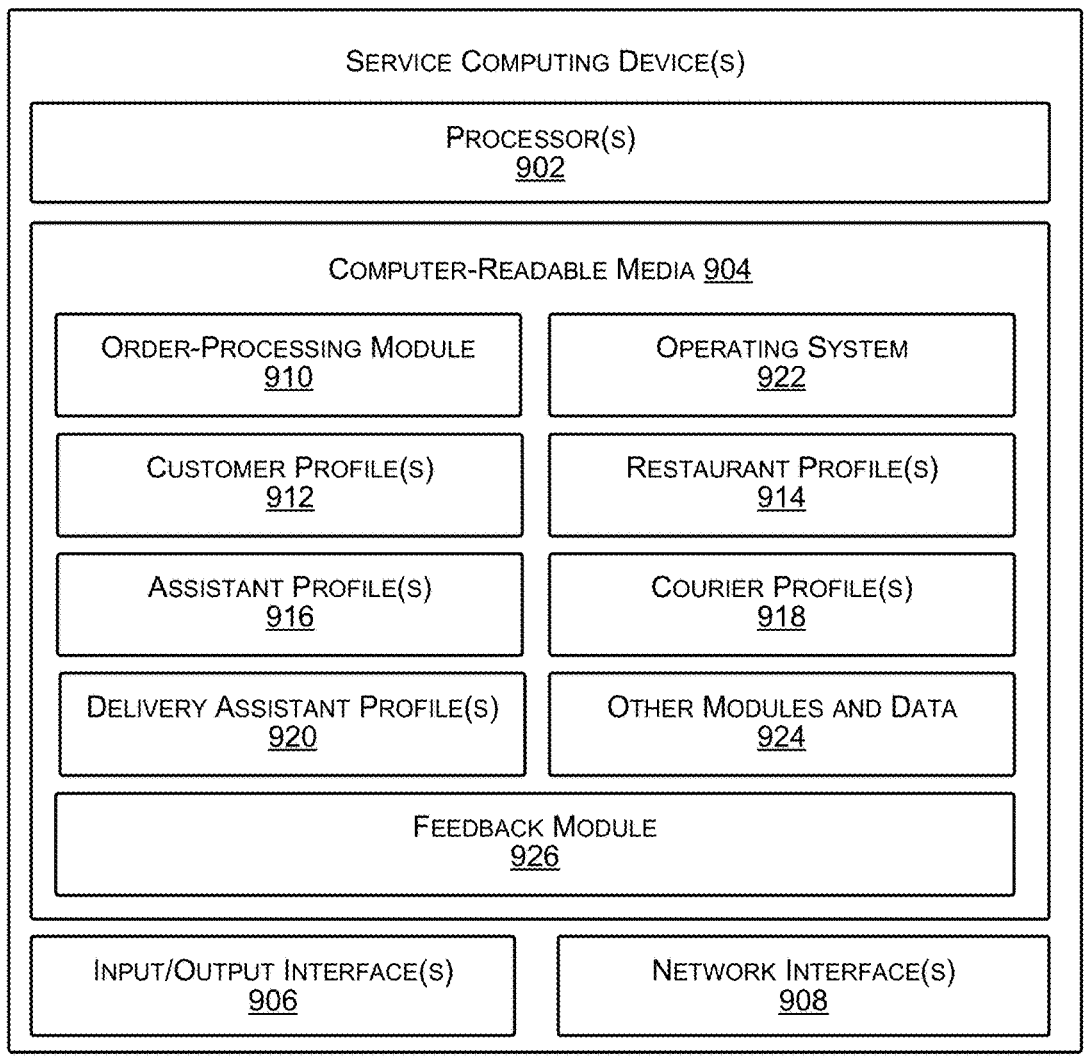
FIG. 9 illustrates an example server computing device for use in an optimized food service system.

FIG. 9 illustrates an example service computing device 900, such as service computing device 102, for use in an optimized food service system. The service computing device 900 may be any suitable type of computing device, e.g., mobile, semi-mobile, semi-stationary, or stationary. The service computing device 900 may belong to a variety of categories or classes of devices such as traditional server-type devices, desktop computer-type devices, mobile devices, special purpose-type devices, embedded-type devices, and/or wearable-type devices. Thus, service computing device 900 may include a diverse variety of device types and are not limited to a particular type of device. For example, the service-computing device 900 may represent, but is not limited to, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device capable of sending communications and performing the functions according to the techniques described herein.

In the illustrated example, the service computing device 900 includes at least one processor 902, at least one memory 904, one or more input/output (I/O) interfaces 906, one or more network interfaces 908. Each processor 902 can itself comprise one or more processors or processing cores. For example, the processor 902 may be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 may be configured to fetch and execute computer-readable processor-executable instructions stored in the memory 904.

Depending on the configuration of the service computing device 900, the memory 904 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 904 may include, but is not limited to, RAM, ROM, EEPROM, flash memory, solid-state storage, magnetic disk storage, optical storage, and/or other computer-readable media technology. Further, in some cases, the service computing device 900 may access external storage, such as RAID storage systems, storage arrays, network attached storage, storage area networks, cloud storage, or any other medium that may be used to store information and that may be accessed by the processor 902 directly or through another computing device or network. Accordingly, the memory 904 may be computer storage media able to store instructions, modules or components that may be executed by the processor 902. Further, when mentioned, non-transitory computer-readable media exclude media such as energy, carrier signals, electromagnetic waves, and signals per se.

The memory 904 may be used to store and maintain any number of functional components that are executable by the processor 902. In some implementations, these functional components comprise instructions or programs that are executable by the processor 902 and that, when executed, implement operational logic for performing the actions and services attributed above to the service computing device 900. Functional components of the service computing device 900 stored in the memory 904 may include an order-processing module 910, such as order-processing module 108. Functional components of the service computing device 900 stored on the memory 904 may include one or more customer profiles 912, one or more restaurant profiles 914, one or more assistant profile(s) 916, one or more courier profiles 918, and/or one or more delivery assistant profiles 920.

The order-processing module 910 may receive a service request (e.g., food order) from a customer. The order-processing module 910 may store the service request in the customer profile(s) 912 associated with the customer. In various examples, the order-processing module 910 may access customer data stored in the customer profile 912 to process the service request. In various examples, the order-processing module 910 may access restaurant data stored in the restaurant profile(s) 914. In such examples, the order-processing module 910 may use the restaurant data to determine a restaurant to assign to the service request. In various examples, once assigned, the order-processing module 910 may send a preparation instruction to the restaurant associated with the assigned restaurant, to prepare the food order.

The order-processing module 910 may access assistant (e.g., order supervisor) data stored in the assistant profile(s) 916 to determine an order supervisor to assign to the service request. The order-processing module 910 may schedule the identified assistant and may publish the food order to a schedule associated with the assistant, such as in the assistant profile 916. The order-processing module 910 may send an assistant instruction to the assistant, such as via the input/output interface(s) 906. The assistant instruction may instruct the assistant to travel to the restaurant to assist in preparing the food order. The assistant instruction may additionally include serving instructions for dine-in orders, pick-up times for customer pick-up orders and/or delivery orders, a type of service requested (e.g., full service, drop-off), delivery instructions, clean-up instructions, or the like.

The order-processing module 910 may access courier data stored in the courier profile(s) 918 to identify a courier to deliver the food order. The courier may be identified based on an availability schedule, region of operation, history of successful deliveries, or the like. The order-processing module 910 may send a request for delivery services to a courier computing device, such as via the input/output interface(s) 906. The request for delivery services may provide a means by which the courier may accept or deny the delivery assignment. Responsive to receiving an acceptance of the delivery or not receiving a denial of the delivery within a threshold time, the order-processing module 910 may schedule the courier for delivery.

The order-processing module 910 may access delivery assistant data stored in the delivery assistant profile(s) 920 to identify a delivery assistant to assist in delivering the food order. The delivery assistant may be identified based on an availability schedule, region of operation, history of successful deliveries, location proximate to the scheduled pick-up time, traffic considerations, parking considerations, weather considerations, a size of an order, delivery times for multiple orders being close to one another, or the like. The order-processing module 910 may send a request for delivery services to a delivery assistant computing device, such as via the input/output interface(s) 906. The request for delivery services may provide a means by which the delivery assistant may accept or deny the delivery assignment.

Responsive to receiving an acceptance of the delivery or not receiving a denial of the delivery within a threshold time, the order-processing module 910 may schedule the delivery assistant to assist in delivering the food order.

Additionally, the order-processing module 910 may schedule a courier and/or delivery assistant to pick-up remaining service items and/or leftover food at the delivery location and return them to a food service center. The courier and/or the delivery assistant may be the same or a different courier and/or delivery assistant than the courier identified for the delivery. The order-processing module 910 may additionally send a notification to the order supervisor (e.g., assistant) to package and/or pick-up remaining service items and/or leftover food at the delivery location and return them to a food service center.

Additional functional components may include an operating system 922 for controlling and managing various functions of the service computing device 900. The memory 904 may also store other modules and data 924, which may include programs, drivers, etc., and the data used or generated by the functional components, to enable efficient and effective food order processing. Further, the service computing device 900 may include many other logical, programmatic and physical components, of which those described are merely examples that are related to the discussion herein. In addition, the memory 904 may also store data, data structures and the like, that are used by the functional components.

Additionally, the memory 904 may include a feedback module 926. The feedback module 926 may be configured to receive feedback data from the customer, restaurant, assistant, courier, and/or delivery assistant associated with an order. The feedback module 926 may process the information and store it in an appropriate profile. For example, the feedback module 926 may receive information from a courier or delivery assistant regarding delivery complications associated with the order. The feedback module 926 may process the feedback and store the information in a customer profile associated with the order. The delivery complication information may be provided to delivery personnel associated with subsequent orders for the customer. For another example, the restaurant associated with an order may determine that receiving a preparation instruction 6 hours prior to a pick-up time for an order comprising preparation for 30 meals was insufficient. The restaurant may provide the feedback to the service computing device 900, which may be processed by the feedback module 926. The feedback module 926 may store an instruction in the restaurant profile 914 to provide notification more than 6 hours prior to a pick-up time for orders comprising more than 29 meals. For yet another example, an order supervisor may weigh an amount of leftover food remaining after the meal and submit a weight to the service computing device. The feedback module 926 may receive the weight and may compare the weight to the initial weight per meal headcount. The feedback module 926 may cause the difference between the initial and final weights to be stored in a customer profile associated with the customer for future processing. The order-processing module 910 may thus adjust a weight per meal headcount for the customer based on the feedback.

The I/O interface(s) 906, may include speakers, a microphone, a camera, and various user controls (e.g., buttons, a joystick, a keyboard, a keypad, etc.), a haptic output device, and so forth. The network interface(s) 908 may include one or more interfaces and hardware components for enabling communication with various other devices over the network or directly. For example, network interface(s) 908 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Figure 10:
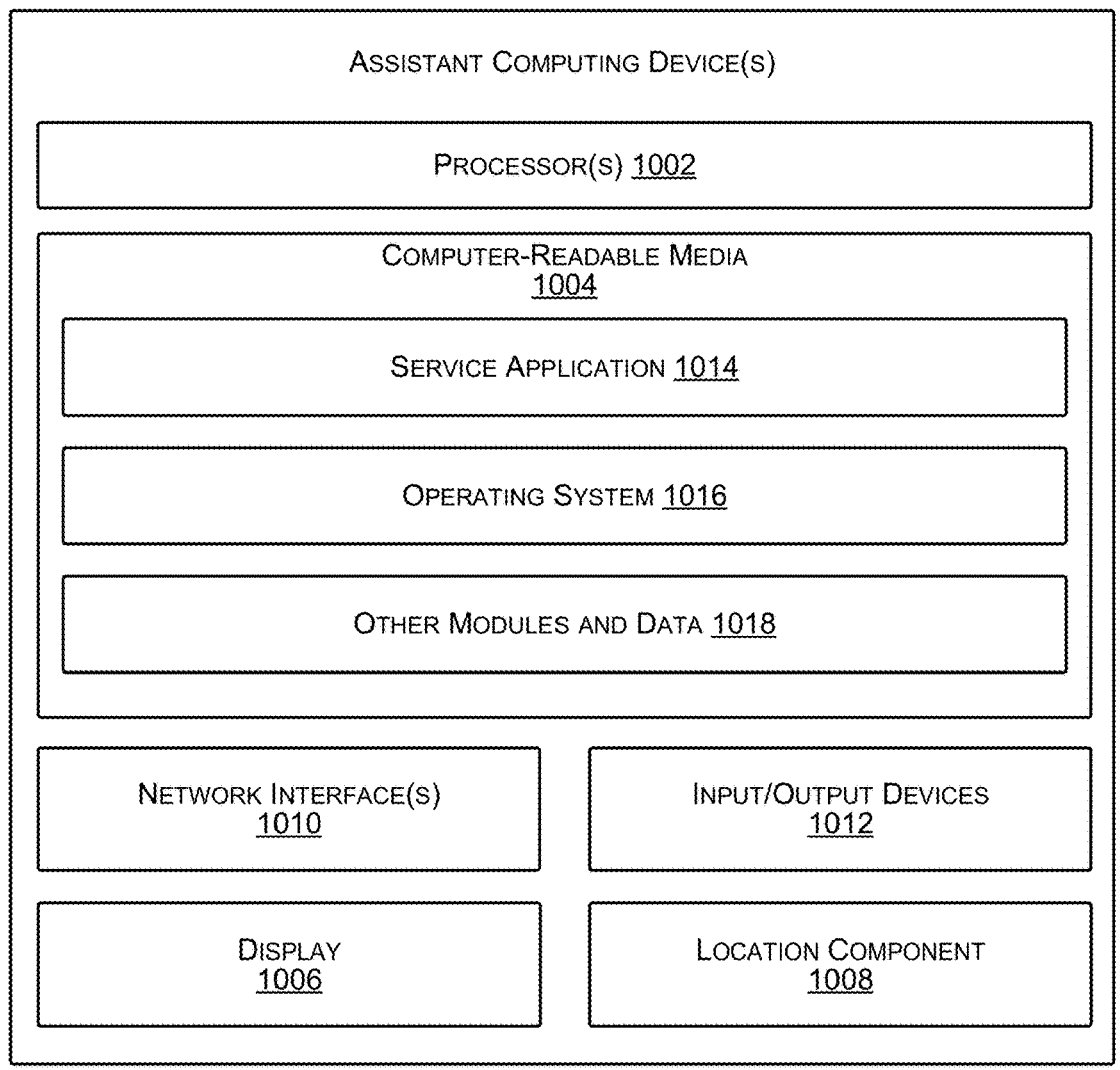
FIG. 10 illustrates an example assistant computing device for use in an optimized food service system.

FIG. 10 illustrates an example assistant computing device 1000 for use in an optimized food delivery system. The assistant computing device 1000 may be any suitable type of computing device, e.g., mobile, semi-mobile, semi-stationary, or stationary. Some examples of the assistant computing device 1000 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the assistant computing device 1000 includes at least one processor 1002, at least one memory 1004, a display 1006, a location component 1008, one or more network interfaces 1010, and one or more input/output (I/O) interfaces 1012. Each processor 1002 can itself comprise one or more processors or processing cores. For example, the processor 1002 may be implemented as one or more microprocessors, microcomputers, microcontrollers, digital signal processors, central processing units, state machines, logic circuitries, and/or any devices that manipulate signals based on operational instructions. In some cases, the processor 1002 may be one or more hardware processors and/or logic circuits of any suitable type specifically programmed or configured to execute the algorithms and processes described herein. The processor 1002 may be configured to fetch and execute computer-readable processor-executable instructions stored in the memory 1004.

Depending on the configuration of the assistant computing device 1000, the memory 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1004 may include, but is not limited to, RAM, ROM, EEPROM, flash memory, solid-state storage, magnetic disk storage, optical storage, and/or other computer-readable media technology. Further, in some cases, the assistant computing device 1000 may access external storage, such as RAID storage systems, storage arrays, network attached storage, storage area networks, cloud storage, or any other medium that may be used to store information and that may be accessed by the processor 1002 directly or through another computing device or network. Accordingly, the memory 1004 may be computer storage media able to store instructions, modules or components that may be executed by the processor 1002. Further, when mentioned, non-transitory computer-readable media exclude media such as energy, carrier signals, electromagnetic waves, and signals per se.

The memory 1004 may be used to store and maintain any number of functional components that are executable by the processor 1002. In some implementations, these functional components comprise instructions or programs that are executable by the processor 1002 and that, when executed, implement operational logic for performing the actions and services attributed above to the assistant computing device 1000. Functional components of the assistant computing device 1000 stored in the memory 1004 may include a service application 1014, discussed above. The service application 1014 may present an interface on the assistant computing device 1000 to enable the assistant to access a schedule and/or details regarding assigned order supervisor duties. Further, the service application 1014 may present an interface to enable the buyer to manage a buyer profile. Additional functional components may include an operating system 1016 for controlling and managing various functions of the assistant computing device 1000 and for enabling basic user interactions with the assistant computing device 1000.

In addition, the memory 1004 may store data, data structures and the like, that are used by the functional components. For example, this data may include item information that includes information about the items offered by the merchant, which may include images of the items, descriptions of the items, prices of the items, and so forth. Depending on the type of the assistant computing device 1000, the memory 1004 may also optionally include other modules and data 1018, which may include programs, drivers, etc., and the data used or generated by the functional components. Further, the assistant computing device 1000 may include many other logical, programmatic and physical components, of which those described are merely examples that are related to the discussion herein.

FIG. 10 further illustrates that the assistant computing device 1000 may include the display 1006 mentioned above. Depending on the type of computing device used as the assistant computing device 1000, the display 1006 may employ any suitable display technology. For example, the display 1006 may be a liquid crystal display, a plasma display, a light emitting diode display, an OLED (organic light-emitting diode) display, an electronic paper display, or any other suitable type of display able to present digital content thereon. In some examples, the display 1006 may have a touch sensor associated with the display 1006 to provide a touchscreen display configured to receive touch inputs for enabling interaction with a graphical user interface presented on the display 1006. Accordingly, implementations herein are not limited to any particular display technology.

In various examples, the location component 1008 may include a GPS subsystem including a device to provide location information. In some examples, the location component 1008 may comprise a non-GPS based location-based sensor. The assistant computing device 1000 may also include one or more additional sensors (not shown), such as an accelerometer, gyroscope, compass, proximity sensor, and the like. Additionally, the assistant computing device 1000 may include various other components that are not shown, examples of which include removable storage, a power control unit, and so forth.

The one or more network interface(s) 1010 may include one or more interfaces and hardware components for enabling communication with various other devices over the network or directly. For example, network interface(s) 1010 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O interfaces 1012, meanwhile, may include speakers, a microphone, a camera, and various user controls (e.g., buttons, a joystick, a keyboard, a keypad, etc.), a haptic output device, and so forth.

Figure 11:
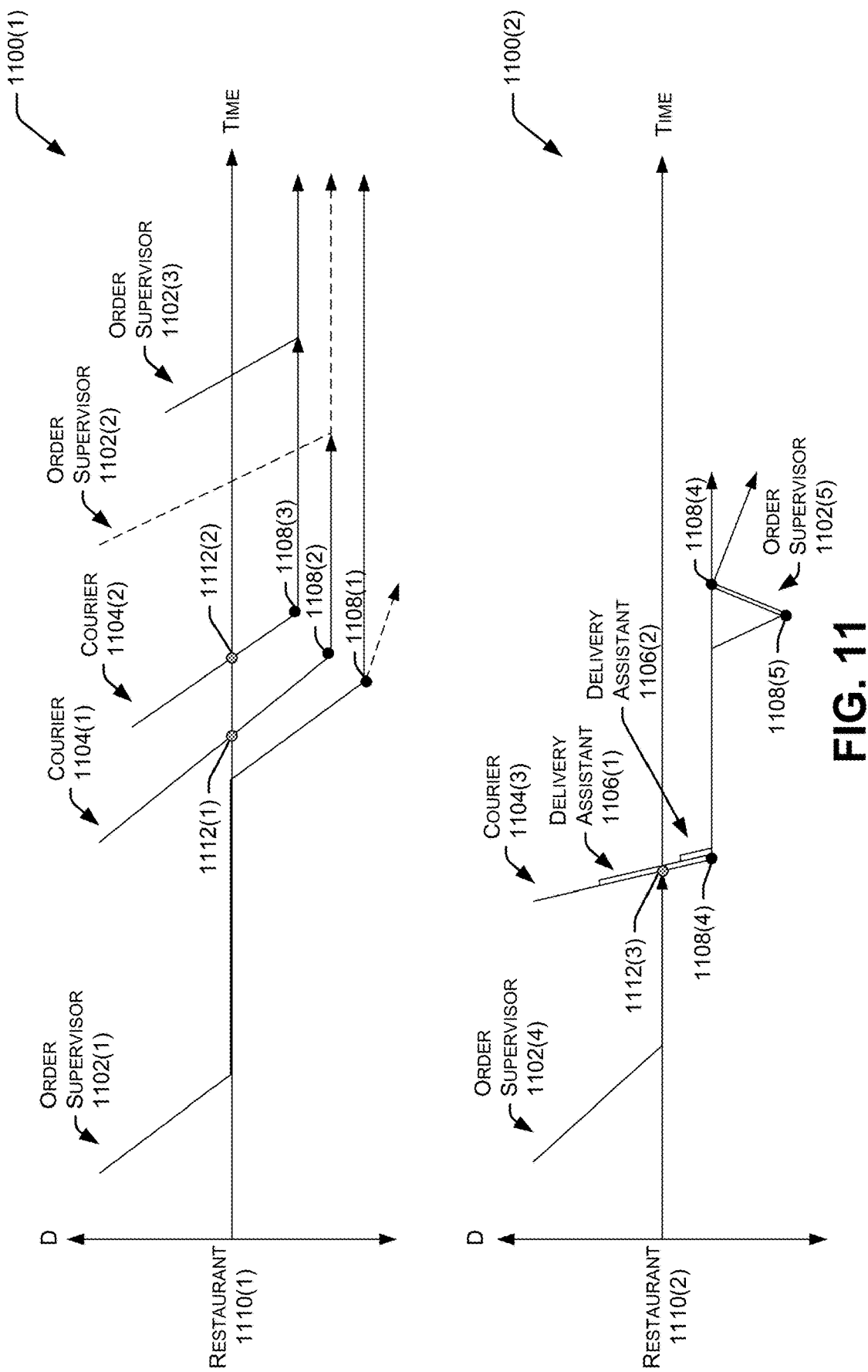
FIG. 11 is an example time-distance graph illustrating an index of narratives described above with respect to FIGS. 1-8.

FIG. 11 are example time-distance graphs 1100(1) and 1100(2) illustrating an index of narratives of order supervisors 1102, such as order supervisor 116, couriers 1104, such as courier 124, and delivery assistants 1106, such as delivery assistant 132. In various examples, a service computing device, such as service computing device 102, may receive one or more orders from one or more customers. The customer(s) may each be associated with a customer location 1108, such as customer location 1108(1), 1108(2), and 1108(3). In some examples, the service computing device may receive the order(s) and identify a restaurant 1110 to associate with the orders. In some examples, the restaurant 1110 may be assigned based on a location associated with the restaurant 1110 being within a threshold distance from the customer location 1108. In some examples, the restaurant 1110 may be assigned based on customer data and/or food data associated with the customer.

In various examples, the service computing device may send a food preparation message (e.g., food preparation instruction) to the restaurant 1110, instructing the restaurant 1110 to prepare the order(s). In some examples, the food preparation message may include an instruction for the restaurant 1110 to prepare orders for pick-up at a pick-up time on the delivery day/date or for consumption at the restaurant, if the customer selects a dine-in option. In various examples, the service computing device may be configured to determine the pick-up time based on a delivery time requested by the customer. The pick-up time may be determined based on a distance from the restaurant 1110 to a first customer location 1104(1), known traffic patterns, known parking considerations (e.g., parking availability proximate to the delivery location), weather considerations, a scheduled delivery assistant 1106 or order supervisor 1102 to accompany a courier 1106 in delivery, or the like.

In various examples, the service computing device 102 may identify an order supervisor 1102(1) (e.g., assistant) to assist in preparation of a set of orders at a restaurant 1110. In some examples, the order supervisor 1102, such as order supervisor 1102(1), may be identified based on availability on a work schedule. In such examples, the service computing device may access the work schedule on an order supervisor profile associated with the order supervisor 1102(1). In some examples, the order supervisor 1102 may be identified based on an assigned and/or preferred region (e.g., neighborhood, district, etc.) in which the order supervisor 1102 operates. In various examples, the service computing device may identify the order supervisor 1102 based on one or more preferences associated with the order supervisor 1102(1).

Responsive to identifying a order supervisor 1102(1) for a batched order, the service computing device 102 may schedule the order supervisor 1102(1). Based on the schedule, the order supervisor 1102(1) may travel to the restaurant 1110 at a time prior to the designated pick-up time, to assist in order preparation and/or to perform quality control measures on the order(s). In the illustrative example, the order supervisor 1102(1) may prepare the order(s) at the restaurant 1110 and may travel to a first customer location 1108(1) to deliver at least one order of the one or more order. In such an example, the order supervisor 1102(1) may ride with a courier 1104, operate a vehicle, take public transportation, or the like, to deliver the at least one order to the customer location 1108(1).

In various examples, the order supervisor 1102(1) may drop off the at least one order with a point of contact at the customer location 1108(1). In such examples, the order supervisor 1102(1) may depart the customer location 1108(1) after drop-off (illustrated by the dashed line). In some examples, the order supervisor 1102(2) may remain at the customer location 1108(1) to set up the order, serve the order, and/or break-down the order (e.g., package up remaining service items and/or leftovers).

As illustrated in FIG. 11, a first courier 1104(1) may arrive at the restaurant 1110 at a first pick-up time 1112(1) to pick up at least one order of the one or more orders. The first courier 1104(1) may deliver the at least one order to a second customer location 1108(2). In various examples, the first courier 1104(1) may drop off the at least one order with a second order supervisor 1102(2). In some examples, the second order supervisor 1102(2) may receive the at least one order and may provide the at least one order to the customer. In the illustrative example, the second order supervisor 1102(2) may depart the second customer location 1108(2) after providing the at least one order to the customer.

In some examples, a second courier 1104(2) may arrive at the restaurant 1110 at a second pick-up time 1112(2) to pick up at least one order of the one or more orders. Though illustrated as a second time on time-distance graph 100, the second pick-up time may be substantially the same as the first pick-up time 1112(1). As illustrated in FIG. 11, the second courier 1104(2) may deliver the at least one order to a third customer location 1108(3). In some examples, the second courier 1104(2) may drop off the at least one order to a point of contact at the third customer location 1108(3). In some examples, the second courier 1104(2) may drop off the at least one order to a third order supervisor 1102(3). The third order supervisor 1102(3) may be the same or a different order supervisor from the first order supervisor 1102(1) or the second order supervisor 1102(2). In various examples, the order supervisor 1102(3) may receive the at least one order from the second courier 1104(2) to set up the order, serve the order, and/or break-down the order (e.g., package up remaining service items and/or leftovers).

As illustrated in time-distance graph 1100(2), an order supervisor 1102(4) may be assigned to assist in preparing one or more orders at a restaurant 1110(2). The restaurant 1110(2) may be the same or a different restaurant from restaurant 1110(1). Additionally, the order supervisor 1102(4) may be the same or a different order supervisor from order supervisors 1102(1), 1102(2), and/or 1102(3). In the illustrative example, the order supervisor 1102(4) may travel to the restaurant 1110(2) to ensure the order(s) are prepared by a designated pick-up time 1112(3). Additionally, the order supervisor 1102(4) may perform quality control measures on the order(s), such as, for example, weighing meals, testing meal temperatures, verifying final preparation instructions (e.g., heating instructions, further cooking instructions for partially cooked meals, etc.) are included with the order(s), or the like.

At the designated pick-up time 1112(3), a scheduled courier 1104(3) may arrive at the restaurant 1110(2) to pick up the order(s). In various examples, the courier 1104(3) may be assigned to deliver multiple orders to multiple customer locations 1108. In such examples, the service computing device may identify and assign one or more delivery assistants 1106 to assist in the delivery of the orders. In the illustrative example, the courier 1104(3) may pick up a first delivery assistant 1106(1) en route to the restaurant 1110(2) and a second delivery assistant 1106(2) en route from the restaurant 1110(2) to the customer location 1108(4). In other examples, the courier 1104(3) may pick up the first delivery assistant 1106(1) and the second delivery assistant 1106(2) before or after the restaurant locations. In various examples, the pick-up location of the delivery assistants 1106 may be dependent on a location associated with the delivery assistants 1106 when they are identified and/or assigned to assist with a delivery and/or a location associated with the delivery assistants 1106 at or around the pick-up time 1112(3). In various examples, the service computing device may receive location information associated with the delivery assistants 1106 from a location component (e.g., GPS, cellular triangulation, etc.) on a computing device associated with the delivery assistants 1106.

As illustrated in the time-distance graph 1100(2) of FIG. 11, the courier 1104(3) and/or delivery assistants 1106(1) or 1106(2) may deliver a first order at the customer location 1108(4) and may travel to a second customer location 1108(5) to deliver a second order. In some examples, the courier 1104(3) and/or a delivery assistant 1106 may be met by an order supervisor 1102(5). The order supervisor 1102(5) may be the same or a different order supervisor than the order supervisor 1102(4) assigned to prepare the orders at the restaurant 1110(2). In some examples, the order supervisor 1102(5) may receive the second order from the courier 1104(3) and/or a delivery assistant 1106 and may provide the order to a point of contact at the customer location 1108(5). In various examples, the order supervisor 1102(5) may set up, serve, clean up, and/or package remaining service items and/or leftovers associated with the second order. In some examples, the order supervisor 1102(5) may additionally evaluate a number of remaining service items and/or an amount (e.g., weight) of some or all of the leftovers, such as, for example, weight remaining per meal, weight remaining per entrée, or the like. In the illustrative example, the order supervisor 1102(5) may assist in delivering the second order to the customer and may subsequently travel to the first customer location 1108(4) with the courier to clean up and/or package remaining service items and/or leftovers associated with the first order. In some examples, the order supervisor 1102(5) may ride with the courier 1104(3) to a food service center to deliver the remaining service items and/or leftovers. In some examples, the order supervisor 1102(5) may take public transportation, a personal vehicle, or other means of transportation to the food service center.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
   receiving, by a service computing device of a service provider, a plurality of food orders, each food order of the plurality of food orders being received from a corresponding one of a plurality of customer devices and including both a delivery time and a location for delivery, each customer device being associated with a corresponding one of a plurality of customers of the service provider;
   sending, by the service computing device to a restaurant computing device associated with a restaurant corresponding to the plurality of food orders, a batch of food orders including the plurality of food orders, a food preparation instruction to prepare each food order in the batch of food orders and a pick-up time for each food order in the batch of food orders;

automatically identifying one or more couriers for the batch of food orders, identification of each of the one or more couriers being based, at least in part, on traffic and parking considerations;

responsive to identifying the one or more couriers, sending, by the service computing device, for each courier of the one or more couriers, a delivery instruction to a corresponding computing device associated with the courier to cause the courier to pick up an assigned set of one or more food orders of the batch of food orders at the restaurant and deliver each food order of the assigned set of food orders to the corresponding location for delivery;

monitoring, in substantially real-time, traffic between a location associated with the restaurant and the delivery locations and parking availability at or near the delivery locations;

updating one or more of the pick-up times based, at least in part, on traffic between the location associated with the restaurant and the delivery locations and on the parking availability at or near the delivery locations; and causing display, on a user interface of a device associated with the restaurant, of the updated one or more pick-up times.

2. The method of claim 1, further comprising identifying the restaurant based at least in part on at least one of:
a preference of a first one of the customers;
a dislike of the first customer;
an allergy associated with one of the people to be fed; or
the location associated with the restaurant being within a threshold distance of the location.

3. The method of claim 1, further comprising:
sending, by the service computing device to an assistant computing device, a second delivery instruction to cause an assistant of the service provider to travel with at least one of the couriers to deliver at least one of the food orders to at least one of the delivery locations.

4. The method of claim 1, prior to sending the delivery instruction, the method further comprising:
identifying each of the couriers based at least in part on a region of operation of each courier.

5. The method of claim 1, further comprising:
identifying a delivery assistant to assist at least one of the couriers; and
sending, to a delivery assistant computing device associated with the delivery assistant, a delivery assistant instruction to cause the delivery assistant to meet the courier at a meeting location and assist the courier in the delivery of at least one of the food orders.

6. The method of claim 5, wherein the delivery assistant instruction includes an instruction to:
set up the at least one food order;
complete cooking of partially cooked items in the at least one food order;
to serve the at least one food order to the people to be fed;
package remaining service items after the people to be fed have finished eating;
package leftover food after the people to be fed have finished eating; and
deliver remaining service items to a food service center.

7. A computing system implemented using a server system comprising processor circuitry, the computing system being configured to cause:

processing, by a service computing device of a service provider associated with the computing system, a plurality of food orders, each food order of the plurality of food orders being received from a corresponding one of a plurality of customer devices and including a delivery time and a location for delivery, each customer device being associated with a corresponding one of a plurality of customers of the service provider, sending, by the service computing device to a restaurant computing device associated with a restaurant corresponding to the plurality of food orders, a batch of food orders including the plurality of food orders, a food preparation instruction to prepare each food order in the batch of food orders and a pick-up time for each food order in the batch of food orders;

automatically identifying one or more couriers for the batch of food orders, identification of each of the one or more couriers being based, at least in part, on traffic and parking considerations;

responsive to identifying the one or more couriers, sending, by the service computing device, for each courier of the one or more couriers, a delivery instruction to a corresponding computing device associated with the courier to cause the courier to pick up an assigned set of one or more food orders of the batch of food orders at the restaurant and deliver each food order of the assigned set of food orders to the corresponding location for delivery;

monitoring, in substantially real-time, traffic between a location associated with the restaurant and the delivery locations and parking availability at or near the delivery locations;

updating one or more of the pick-up times based, at least in part, on traffic between the location associated with the restaurant and the delivery locations and on the parking availability at or near the delivery locations; and displaying, on a user interface of a device associated with the restaurant, of the updated one or more pick-up times.

8. The computing system of claim 7, the computing system further configured to cause:
identifying the restaurant based at least in part on at least one of:
a preference of a first one of the customers;
a dislike of the first customer;
an allergy associated with one of the people to be fed; or
the location associated with the restaurant being within a threshold distance of the location.

9. The computing system of claim 7, the computing system further configured to cause:
sending, by the service computing device to an assistant computing device, a second delivery instruction to cause the assistant of the service provider to travel with at least one of the couriers to deliver at least one of the food orders to at least one of the delivery locations.

10. The computing system of claim 7, the computing system further configured to cause:
identifying each of the couriers based at least in part on a region of operation of each courier.

11. The computing system of claim 7, the computing system further configured to cause:
identifying a delivery assistant to assist at least one of the couriers; and
sending, to a delivery assistant computing device associated with the delivery assistant, a delivery assistant instruction to cause the delivery assistant to meet the courier at a meeting location and assist the courier in the delivery of at least one of the food orders.

12. The computing system of claim 11, wherein the delivery assistant instruction includes an instruction to:
set up the at least one food order;
complete cooking of partially cooked items in the at least one food order;
to serve the at least one food order to the people to be fed;
package remaining service items after the people to be fed have finished eating;
package leftover food after the people to be fed have finished eating; and
deliver remaining service items to a food service center.

13. A non-transitory computer readable medium comprising computer-readable program code capable of being executed by one or more processors when retrieved from a non-transitory computer-readable medium, the program code comprising instructions configured to cause:
processing, by a service computing device of a service provider, a plurality of food orders, each food order of the plurality of food orders being received from a corresponding one of a plurality of customer devices and including a delivery time and a location for delivery, each customer device being associated with a corresponding one of a plurality of customers of the service provider;
sending, by the service computing device to a restaurant computing device associated with a restaurant corresponding to the plurality of food orders, a batch of food orders including the plurality of food orders, a food preparation instruction to prepare each food order in the batch of food orders and a pick-up time for each food order in the batch of food orders;
automatically identifying one or more couriers for the batch of food orders, identification of each of the one or more couriers being based, at least in part, on traffic and parking considerations;
responsive to identifying the one or more couriers, sending, by the service computing device, for each courier of the one or more couriers, a delivery instruction to a corresponding computing device associated with the courier to cause the courier to pick up an assigned set of one or more food orders of the batch of food orders at the restaurant and deliver each food order of the assigned set of food orders to the corresponding location for delivery;
monitoring, in substantially real-time, traffic between a location associated with the restaurant and the delivery locations and parking availability at or near the delivery locations;
updating one or more of the pick-up times based, at least in part, on traffic between the location associated with the restaurant and the delivery locations and on the parking availability at or near the delivery locations; and
displaying, on a user interface of a device associated with the restaurant, of the updated one or more pick-up times.

14. The non-transitory computer readable medium of claim 13, the instructions being further configured to cause:
identifying the restaurant based at least in part on at least one of:
a preference of a first one of the customers;
a dislike of the first customer;
an allergy associated with one of the people to be fed; or
the location associated with the restaurant being within a threshold distance of the location.

15. The non-transitory computer readable medium of claim 13, the
instructions being further configured to cause:
sending, by the service computing device to an assistant computing device, a second delivery instruction to cause an assistant of the service provider to travel with at least one of the couriers to deliver at least one of the food orders to at least one of the delivery locations.

16. The non-transitory computer readable medium of claim 13, the instructions being further configured to cause:
identifying each of the couriers based at least in part on a region of operation of each courier.

17. The non-transitory computer readable medium of claim 13, the instructions being further configured to cause:
identifying a delivery assistant to assist at least one of the couriers; and
sending, to a delivery assistant computing device associated with the delivery assistant, a delivery assistant instruction to cause the delivery assistant to meet the courier at a meeting location and assist the courier in the delivery of at least one of the food orders.

18. The non-transitory computer readable medium of claim 17, wherein the assistant delivery instruction includes an instruction to:
set up the at least one food order;
complete cooking of partially cooked items in the at least one food order;
to serve the at least one food order to the people to be fed;
package remaining service items after the people to be fed have finished eating;
package leftover food after the people to be fed have finished eating; and
deliver remaining service items to a food service center.

* * * * *